(12) United States Patent
Komori

(10) Patent No.: US 12,172,589 B2
(45) Date of Patent: Dec. 24, 2024

(54) DOOR COMPONENT, GROMMET, AND WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 208 days.

(21) Appl. No.: 18/008,059

(22) PCT Filed: May 26, 2021

(86) PCT No.: PCT/JP2021/019928
§ 371 (c)(1),
(2) Date: Dec. 2, 2022

(87) PCT Pub. No.: WO2021/251137
PCT Pub. Date: Dec. 16, 2021

(65) Prior Publication Data
US 2023/0271576 A1   Aug. 31, 2023

(30) Foreign Application Priority Data

Jun. 11, 2020 (JP) ................................ 2020-101375

(51) Int. Cl.
*B60J 10/86* (2016.01)
*B60R 16/02* (2006.01)
(Continued)

(52) U.S. Cl.
CPC .......... *B60R 16/0222* (2013.01); *B60J 10/86* (2016.02); *B60R 16/027* (2013.01); *H01B 17/58* (2013.01); *H02G 3/22* (2013.01)

(58) Field of Classification Search
CPC ....................................................... B60J 10/86
(Continued)

(56) References Cited

U.S. PATENT DOCUMENTS 5,111,858 A * 5/1992 Aittama ................. B60K 15/04
141/382

FOREIGN PATENT DOCUMENTS

JP   H10-024778 A   1/1998
JP   2000-217229 A   8/2000
(Continued)

OTHER PUBLICATIONS

International Search Report issued on Jul. 27, 2021 for WO 2021/251137 A1 (4 pages).

*Primary Examiner* — Stanley Tso
(74) *Attorney, Agent, or Firm* — Venjuris, P.C.

(57) ABSTRACT

An object of the present disclosure is to provide a technique for improving the ease of attaching a door component to a door panel. A door component includes: a grommet that is attached to a door panel so as to traverse a portion of a peripheral edge; and a weather strip that is attached to the door panel so as to extend along a peripheral edge. The grommet includes a first tubular part and a second tubular part that are formed so as to be open in mutually different directions. The weather strip includes a first end part and a second end part along a longitudinal direction. The first end part of the weather strip is fitted into the first tubular part and the second end part is fitted into the second tubular part.

5 Claims, 17 Drawing Sheets

(51) Int. Cl.
*B60R 16/027* (2006.01)
*H01B 17/58* (2006.01)
*H02G 3/22* (2006.01)

(58) Field of Classification Search
USPC .................................................. 174/152 G
See application file for complete search history.

(56) References Cited

FOREIGN PATENT DOCUMENTS

| JP | 2002-027640 A | | 1/2002 |
|----|---------------|---|--------|
| JP | 2002027640 | * | 1/2002 |
| JP | 2002137639 | * | 1/2002 |
| JP | 2002-137639 A | | 5/2002 |

* cited by examiner

DOOR COMPONENT, GROMMET, AND WIRING MODULE

CROSS REFERENCE TO RELATED APPLICATIONS

This application is a national phase of PCT application No. PCT/JP2021/019928, filed on 26 May 2021, which claims priority from Japanese patent application No. 2020-101375, filed on 11 Jun. 2020, all of which are incorporated herein by reference.

TECHNICAL FIELD

The present disclosure relates to a door component, a grommet, and a wiring module.

BACKGROUND

Normally, a grommet is attached to a wiring member that connects a door and a vehicle body. Structures for attaching the grommet to a door panel include a structure in which the grommet is passed through a through hole in a door panel as described in Patent Document 1, for example, and a structure in which a grommet is disposed along a surface of a door panel as described in Patent Document 2, for example. The grommet described in Patent Document 2 does not need to be passed through a through hole in a door panel unlike the grommet described in Patent Document 1, and thus is also called a non-through grommet and the like.

In order to suppress the intrusion of water into the vehicle interior, a weather strip is attached so as to extend along a peripheral edge of the door panel. If the grommet is a non-through grommet, the weather strip is disposed on the surface of the door panel facing the vehicle body so as to traverse the non-through grommet as described in Patent Document 2.

PRIOR ART DOCUMENT

Patent Document

Patent Document 1: JP 2000-217229 A
Patent Document 2: JP 2002-027640 A

SUMMARY OF THE INVENTION

Problems to be Solved

In the case of attaching a weather strip and a non-through grommet as described in Patent Document 2 to a door panel, if the weather strip is attached to the door panel first, the non-through grommet needs to be passed through a space between the door panel and the weather strip. Thus, there is room for improvement in the ease of attachment.

In view of this, an object of the present disclosure is to provide a technique for improving the ease of attaching a door component to a door panel.

Means to Solve the Problem

A door component according to the present disclosure includes: a grommet that is to be attached to a door panel so as to traverse a portion of a peripheral edge; and a weather strip that is to be attached to the door panel so as to extend along a peripheral edge, wherein the grommet includes a first tubular part and a second tubular part that are formed so as to be open in mutually different directions, the weather strip includes a first end part and a second end part along a longitudinal direction, and the first end part of the weather strip is fitted into the first tubular part and the second end part is fitted into the second tubular part.

Effect of the Invention

According to the present disclosure, it is possible to improve the ease of attaching the door component to the door panel.

DETAILED DESCRIPTION TO EXECUTE THE INVENTION

Figure 1:
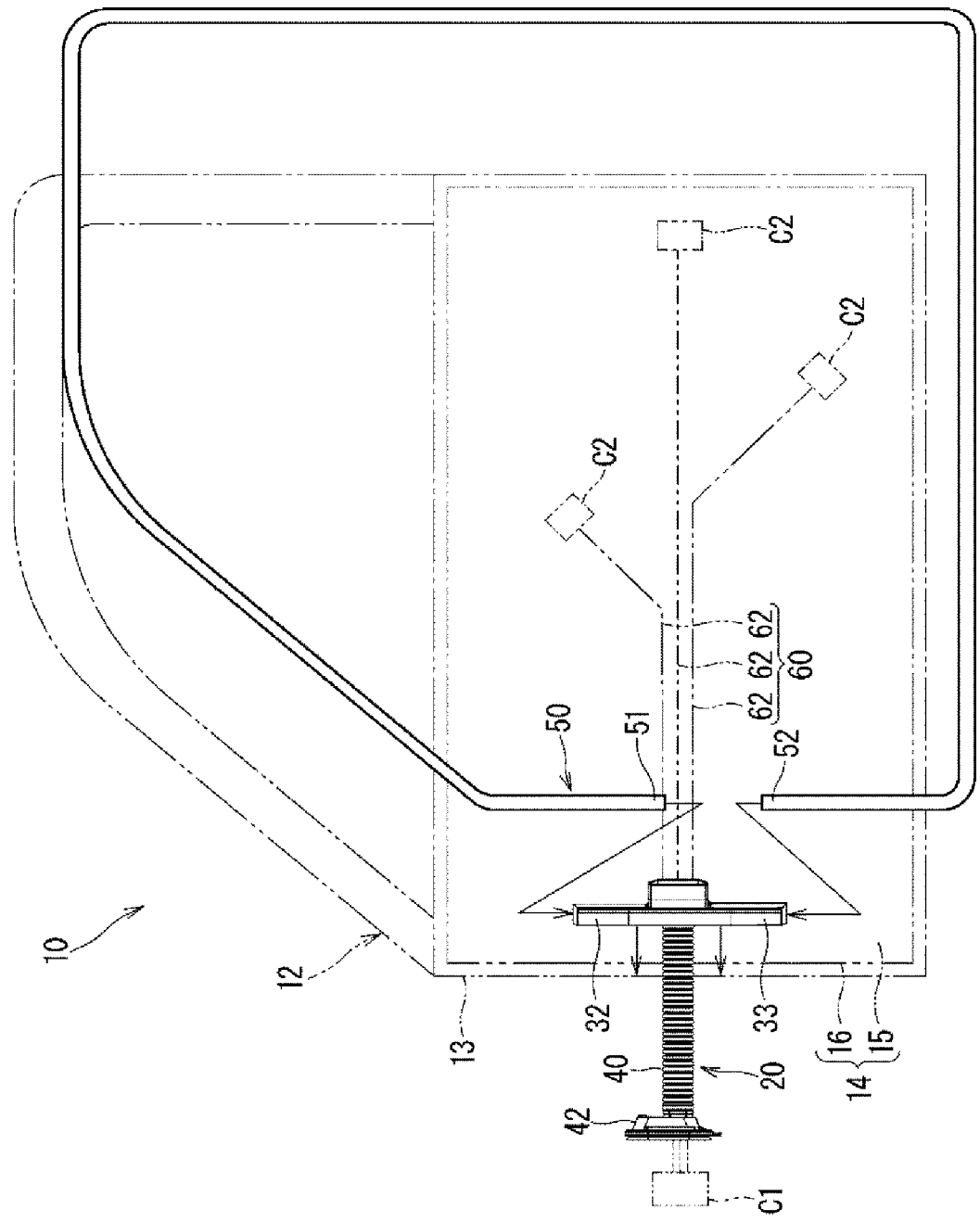
FIG. 1 is a schematic plan view of a door component according to a first embodiment and a door panel to which the door component is attached.

First, embodiments of the present disclosure will be listed and described.

A door component in the present disclosure is as follows.

(1) The door component includes: a grommet that is to be attached to a door panel so as to traverse a portion of a peripheral edge; and a weather strip that is to be attached to the door panel so as to extend along a peripheral edge, wherein the grommet includes a first tubular part and a second tubular part that are formed so as to be open in mutually different directions, the weather strip includes a first end part and a second end part along a longitudinal direction, and the first end part of the weather strip is fitted into the first tubular part and the second end part is fitted into the second tubular part. The first end part of the weather strip is fitted into the first tubular part, and the second end part is fitted into the second tubular part. Accordingly, the end parts of the weather strip attached to the door panel earlier can be fitted into the grommet attached later to the door panel, the end parts of the weather strip assembled later to the door panel can be fitted into the grommet assembled earlier to the door panel, and the grommet and the weather strip can be assembled together to the door panel in a state in which the end parts of the weather strip are fitted into the grommet. This improves the ease of attaching the door component to the door panel.

(2) In the door component according to (1), the grommet may be provided with a lip extending in a circumferential direction on at least a vehicle body-side part of an inner surface of the first tubular part, and the lip may locally crush a portion of the first end part of the weather strip in a closed door state. This improves the sealing properties between the grommet and the weather strip.

(3) In the door component according to (1) or (2), the grommet may be provided with a flange extending from a vehicle body-side part of an opening part of the first tubular part to the outside of the first tubular part, and the flange may come into intimate contact with an outer surface of the weather strip in the closed door state. This improves the sealing properties between the grommet and the weather strip.

(4) In the door component according to any one of (1) to (3), there may be a section where the weather strip is interrupted between the first end part and the second end part of the weather strip, and the grommet may be provided with a weather strip replacement part that water-seals the section in place of the weather strip. This achieves shortening of the weather strip.

(5) In the door component according to (4), a configuration is possible where the weather strip replacement part includes a door-facing protruding part that protrudes toward the door panel and a vehicle body-facing protruding part that protrudes toward the vehicle body, the door-facing protruding part and the vehicle body-facing protruding part connect the first tubular part and the second tubular part and are both elastically deformable so as to be crushed, the door-facing protruding part is in a constantly crushed state when the grommet is attached to the door panel, and the vehicle body-facing protruding part is elastically deformed so as to be crushed in the closed door state and elastically returns in the open door state. This enhances the water-sealing properties of the weather strip replacement part.

(6) The door component according to (4) or (5) may further include a wiring member that is passed through the grommet, wherein the wiring member passes through the grommet so as to overlap the weather strip replacement part. Accordingly, it is possible to suppress the wiring member from contributing to the crushing of the weather strip, so that the weather strip can be crushed in a stable manner.

(7) In the door component according to any one of (1) to (6), the weather strip may be formed continuously from the first end part to the second end part so as to be capable of surrounding the peripheral edge of the door panel. Accordingly, if the weather strip has an annular shape that surrounds the peripheral edge of the door panel, the linear weather strip can be bent and used as it is, and thus there is no need to use an endless annular weather strip.

(8) A grommet of the present disclosure attached to a door panel so as to traverse a peripheral edge, including a first tubular part and a second tubular part that are open in mutually different directions, wherein the first tubular part and the second tubular part are formed such that a first end part and a second end part of a weather strip attached to the door panel along the peripheral edge are capable of being fitted into the first tubular part and the second tubular part, respectively. Accordingly, the end parts of the weather strip attached earlier to the door panel can be fitted into the grommet attached later to the door panel, the end parts of the weather strip attached later to the door panel can be fitted into the grommet attached earlier to the door panel, and the grommet and the weather strip can be attached together to the door panel in a state in which the end parts of the weather strip are fitted into the grommet. This improves the ease of attaching the door component to the door panel.

(9) A wiring module of the present disclosure is a wiring module that includes the grommet according to (8) and a wiring member that is passed through the grommet.

DETAILS OF EMBODIMENTS OF PRESENT DISCLOSURE

Specific examples of a door component, a grommet, and a wiring module in the present disclosure will be described below with reference to the drawings. It should be noted that the present invention is not limited to the examples herein, but is rather indicated by the scope of claims, and is intended to include all modifications within a meaning and scope equivalent to the scope of claims.

First Embodiment

A door component, a grommet, and a wiring module according to a first embodiment are described below.

Door

First, a door of a vehicle will be described with reference to FIG. 1. FIG. 1 is a schematic plan view of a door component according to the first embodiment and a door panel 12 to which the door component is attached.

A door 10 has an overall flat shape and constitutes a part that is provided in an openable and closable manner so as to divide the vehicle interior and the vehicle exterior of the vehicle. In the following description, the open state and closed state of the door 10 in the vehicle will simply be referred to as the open state and the closed state. The door 10 is envisioned as being a driver seat-side door, a passenger seat-side door, a back seat-side door, or the like. In the following description, the door 10 is described as being a side door. The door may be a rear door or the like. The door 10 is also described as being a hinge door. The door may be a sliding door or the like. The door 10 includes a door panel 12 and a door component.

The door panel 12 includes an outer panel 13 and an inner panel 14. The outer panel 13 is a part that is provided on a portion of the door 10 facing the outside of the vehicle and constitutes the outer appearance of the vehicle together along with the vehicle body. The inner panel 14 is provided on the vehicle interior side of the outer panel 13. The inner panel 14 has an inner plate part 15 and a side plate part 16. The inner plate part 15 is a part that faces the vehicle interior side in the closed state. A space in which a window or an electric device can be housed is provided between the inner plate part 15 and the outer panel 13. The side plate part 16 is a part that extends from an edge portion of the inner plate part 15 toward the outer panel 13. In particular, in this example, the side plate part 16 extends from the edge portion of the inner plate part 15 positioned on the front side of the vehicle (the side of the hinge door where the hinge is located). The side plate part 16 divides the space in which a window, an electric device, or the like can be housed.

The door component is a component attached to the door 10. The door component includes a grommet 20, a weather strip 50, and a wiring member 60.

The grommet 20 is a so-called non-through grommet. The grommet 20 is attached to the inner panel 14 of the door panel 12 so as to traverse a portion of the peripheral edge of the door panel 12. The grommet 20 is attached to the side plate part 16. A portion of the weather strip 50 is attached to the grommet 20. The grommet 20 includes a first tubular part 32 and a second tubular part 33. The first tubular part 32 and the second tubular part 33 are open in mutually different directions. In this example, the first tubular part 32 and the second tubular part 33 are open in opposite directions. The weather strip 50 is inserted into the first tubular part 32 and the second tubular part 33.

The weather strip 50 is attached to the door panel 12 so as to extend along the peripheral edge thereof. The weather strip 50 is attached to the inner panel 14 so as to extend along the peripheral edge. The weather strip 50 has a first end part 51 and a second end part 52. The first end part 51 is fitted into the first tubular part 32. The second end part 52 is fitted into the second tubular part 33. In this example, the weather strip 50 is formed continuously from the first end part 51 to the second end part 52. That is, one end part of one linear weather strip 50 constitutes the first end part 51, and the other end part of the same constitutes the second end part 52. The weather strip 50 is attached so as to surround the door panel 12. The length of the weather strip 50 is similar to (in this example, slightly shorter than) the length of the peripheral edge of the door panel 12.

The wiring member 60 is a member that supplies electrical power to devices provided in the door 10 and transmits signals between the devices provided in the door 10 and the devices provided in the vehicle body. Here, the wiring member 60 includes a plurality of electrical wires 62. The wiring member 60 may include optical fiber cables or the like. The path and connection destination of the wiring member 60 in the vehicle are not particularly limited, but the following path and connection destination are conceivable, for example. Specifically, one end part of the wiring member 60 is disposed on the vehicle body. A connector C1 is provided at the one end part of the wiring member 60. The connector C1 is connected to a vehicle-side connector provided on a vehicle body-side wiring member extending from a battery, an electronical control unit, or the like. The other end part of the wiring member 60 is disposed in the door 10. The other end part of the wiring member 60 is connected to devices provided in the door 10. The wiring member 60 and the devices provided in the door 10 may be connected via a connector, for example. In this case, a connector C2 may be provided at the other end part of the wiring member 60.

The intermediate part of the wiring member 60 bridges the vehicle body and the door 10. More specifically, the wiring member 60 extends from one end part to the other end part through a through hole provided in the vehicle body and extends toward the side plate part 16 of the door panel 12. After reaching the side plate part 16, the wiring member 60 extends from the side plate part 16 toward the inner plate part 15 along the door panel 12. The section of the wiring member 60 from the through hole provided in the vehicle body to the inner plate part 15 is covered and protected by the grommet 20. A plurality of electrical wires 62 extend integrally from the portion of the wiring member 60 to which the grommet 20 is attached. The wiring member 60 at the inner plate part 15 extends out from the grommet 20 to the positions of devices to which the plurality of electrical wires 62 are connected while being branched on the inner plate part 15.

In addition to the devices to which the wiring member 60 is connected, a design trim or the like is provided on the door 10, for example. A design trim is a part that is provided at a portion of the door 10 facing the vehicle interior and constitutes the inner appearance of the vehicle. A door handle, an operation unit of an in-vehicle device, and the like are attached to the design trim, for example. A portion of the wiring member 60 extending out from the grommet 20 along the inner plate part 15 is covered by the design trim.

Figure 2:
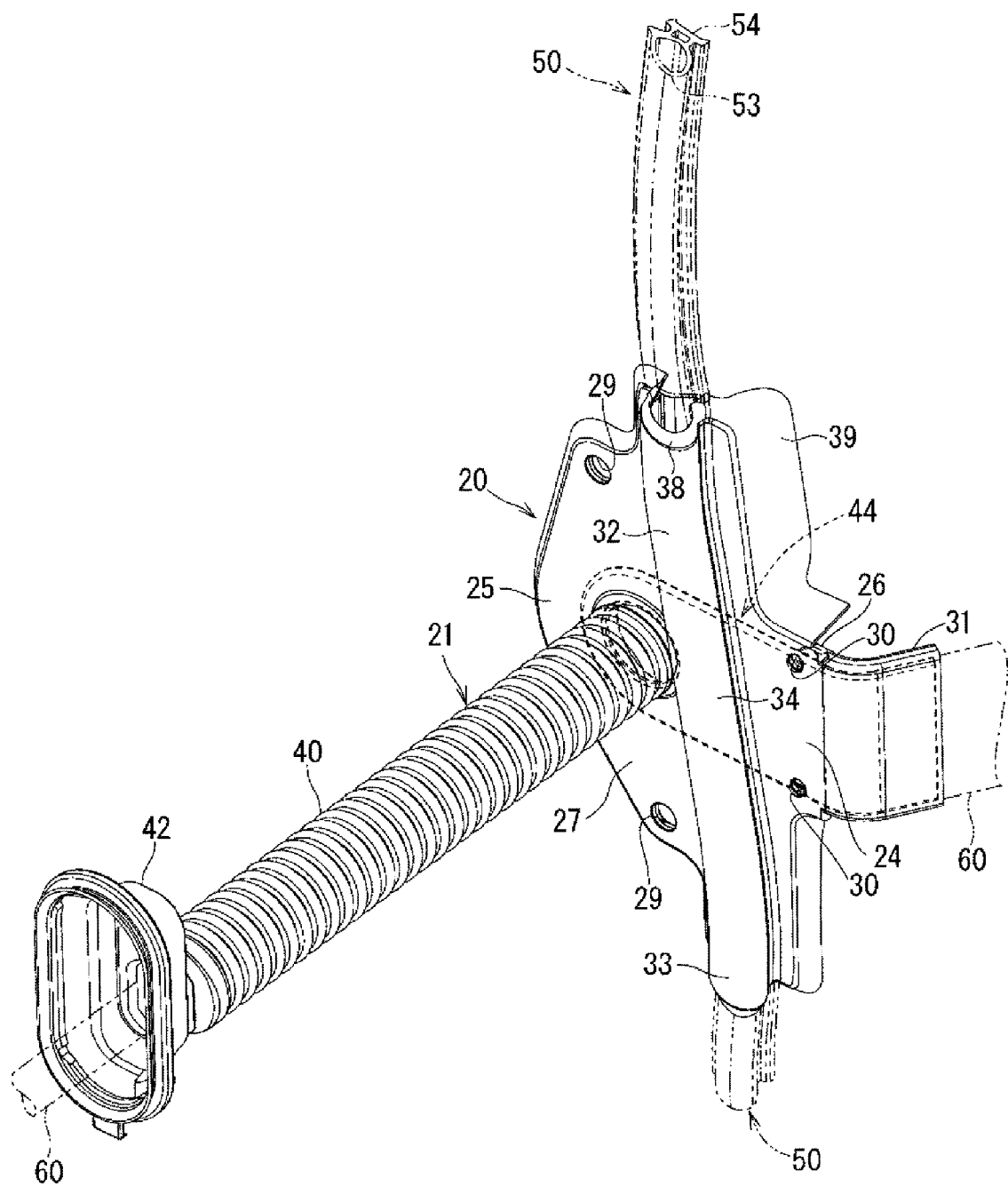
FIG. 2 is a perspective view of the door component according to the first embodiment.
Figure 3:
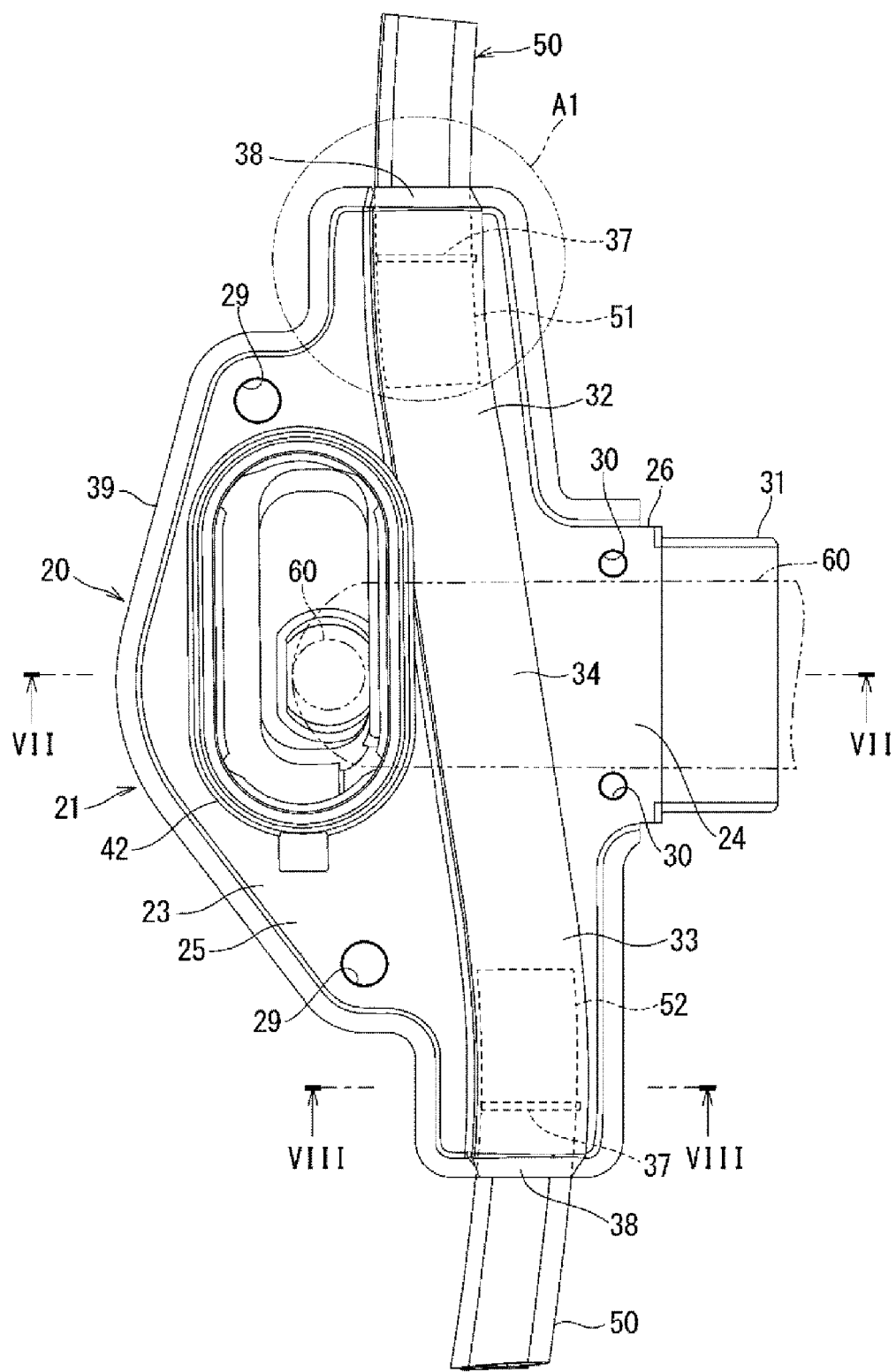
FIG. 3 is a front view of the door component according to the first embodiment.
Figure 4:
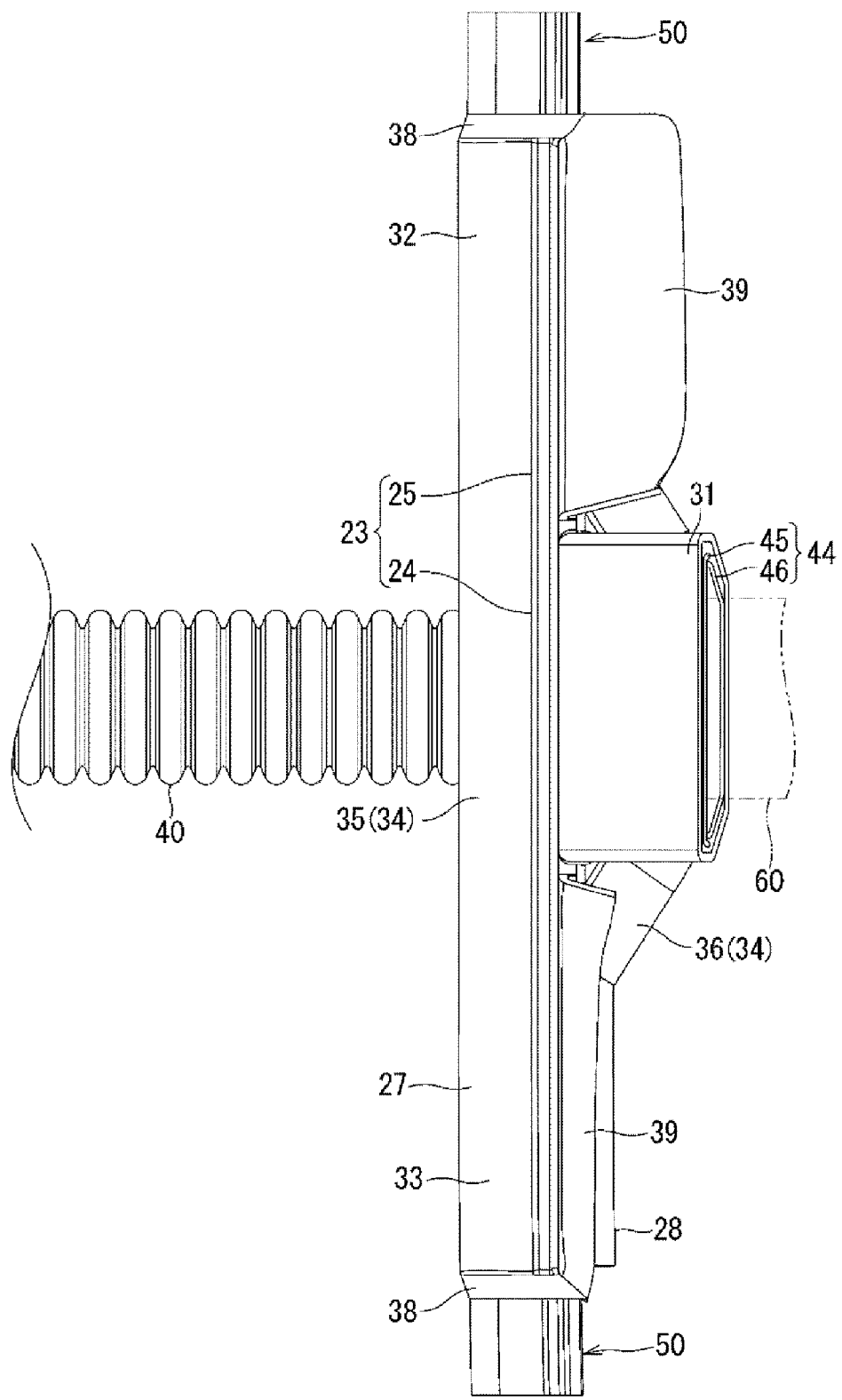
FIG. 4 is a side view of the door component according to the first embodiment.
Figure 5:
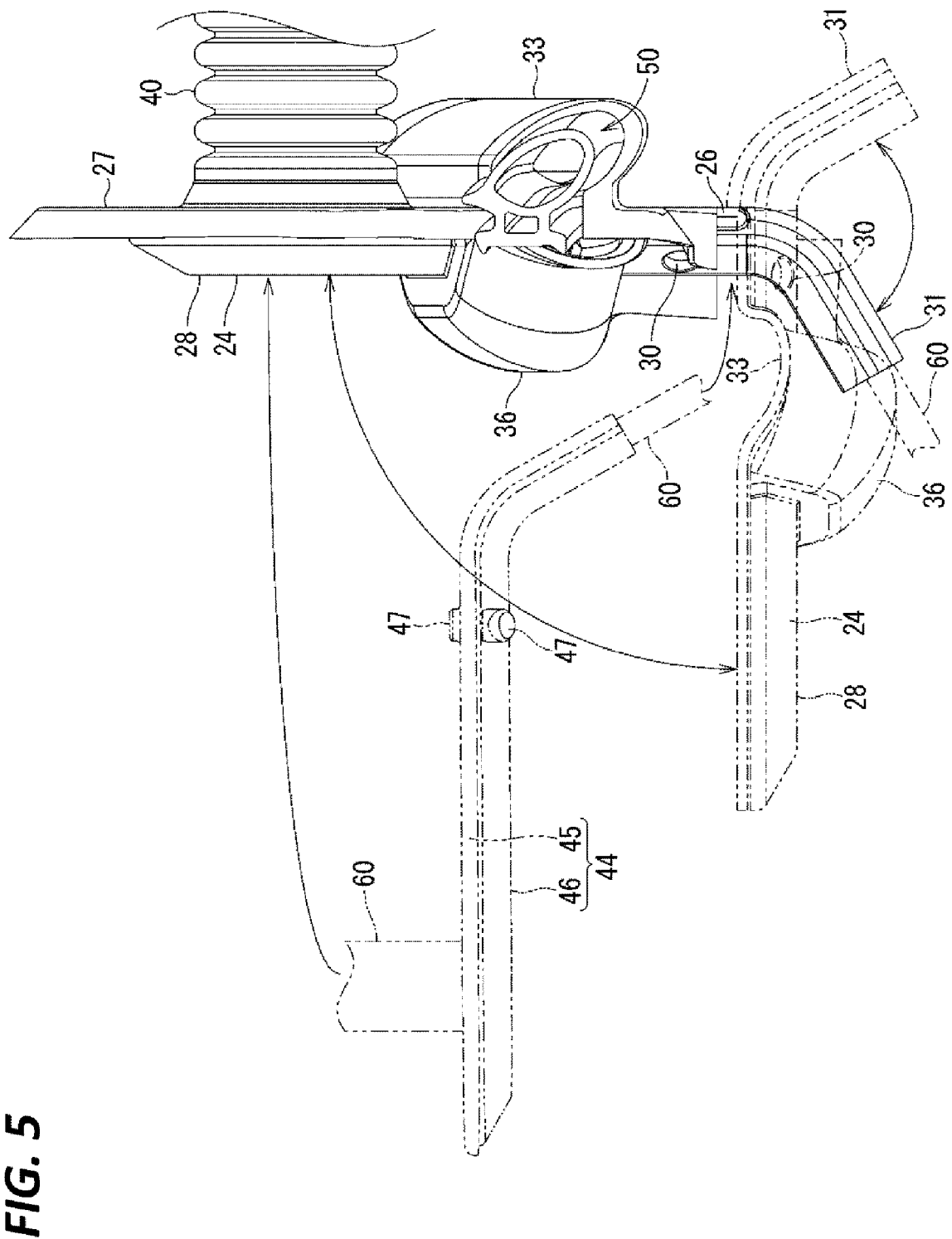
FIG. 5 is a bottom view of the door component according to the first embodiment.
Figure 6:
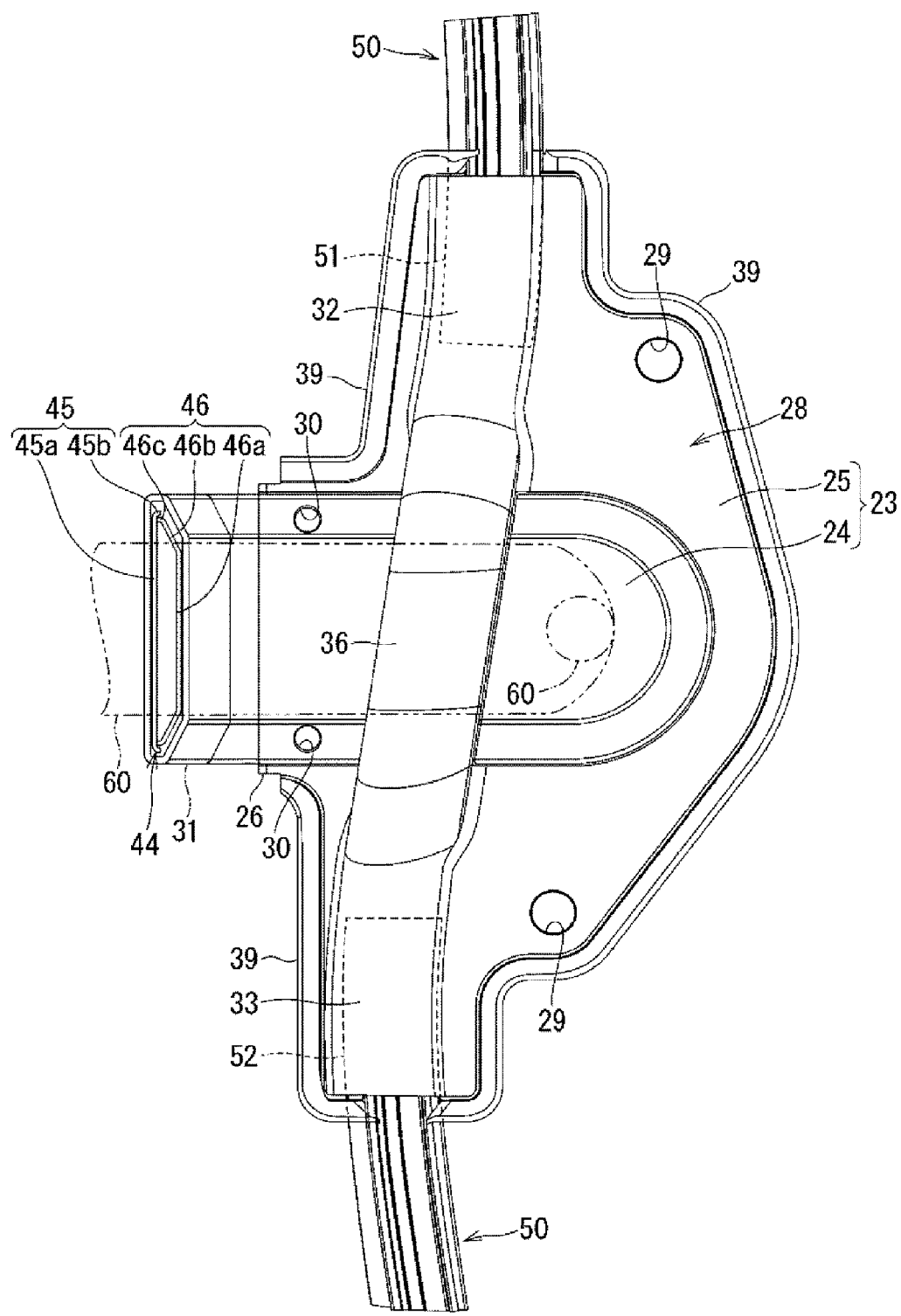
FIG. 6 is a rear view of the door component according to the first embodiment.
Figure 7:
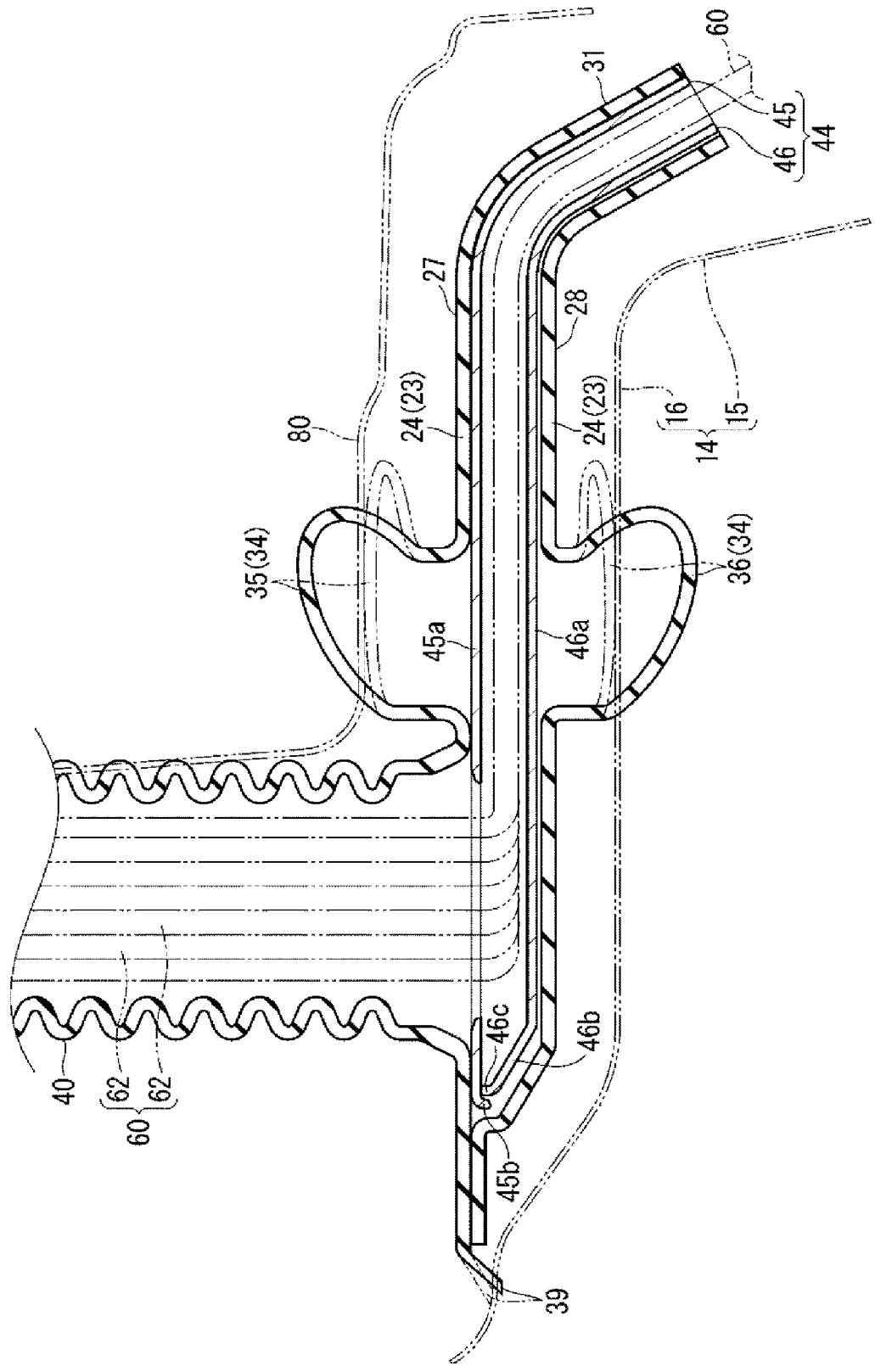
FIG. 7 is a cross-sectional view taken along line VII-VII in FIG. 2.
Figure 8:
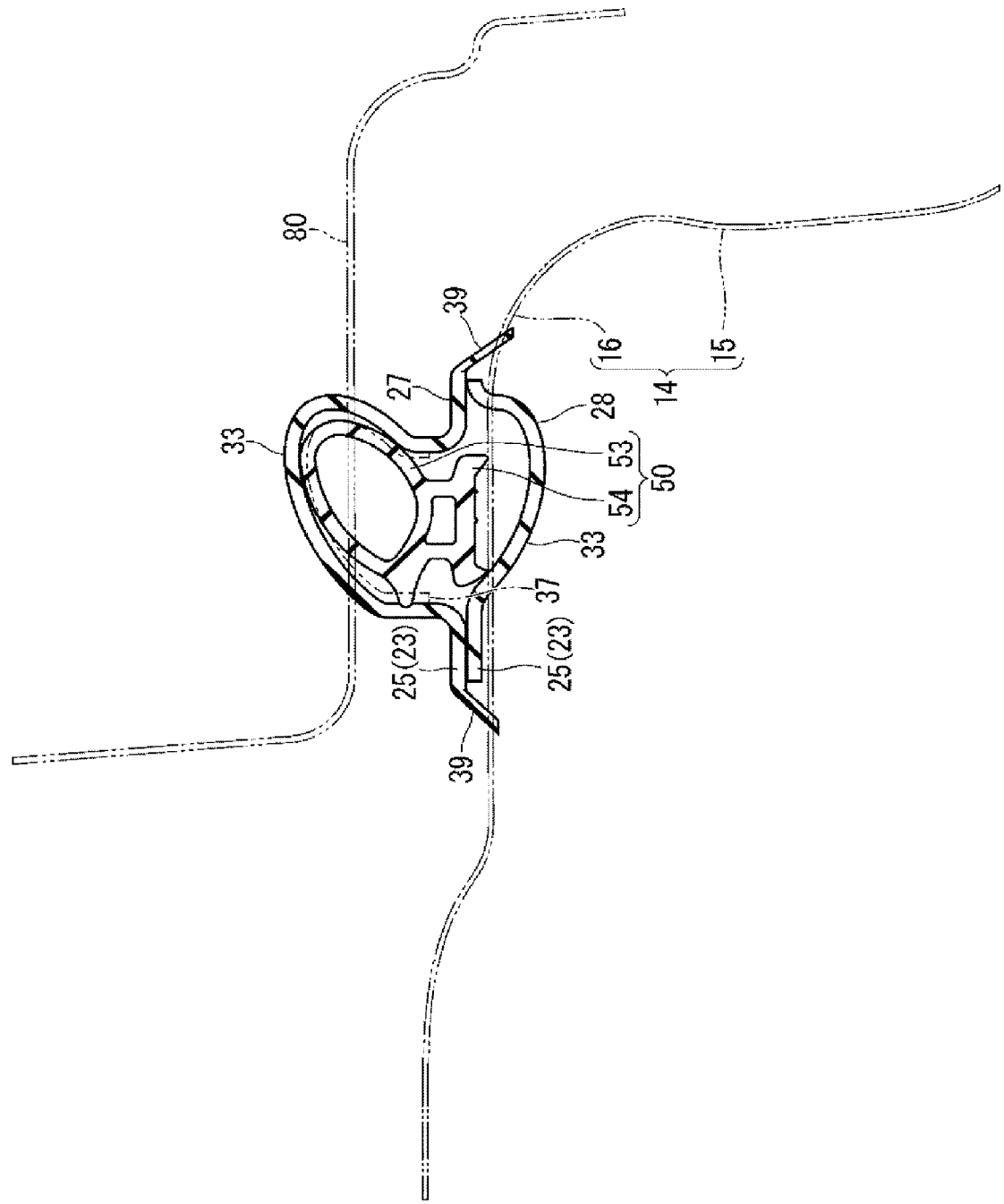
FIG. 8 is a cross-sectional view taken along line VIII-VIII in FIG. 2.
Figure 9:
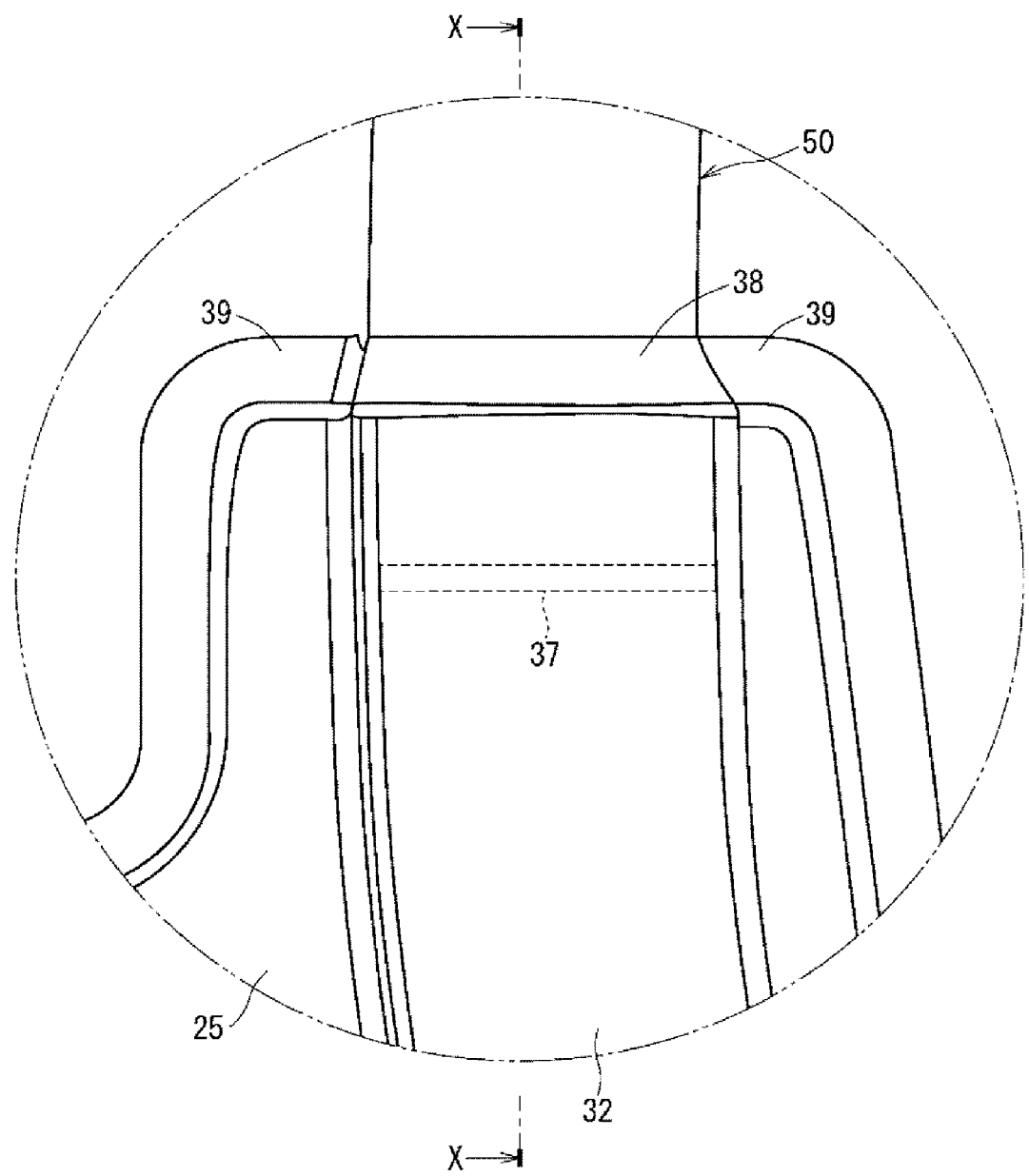
FIG. 9 is an enlarged view of an area A1 in FIG. 3.
Figure 10:
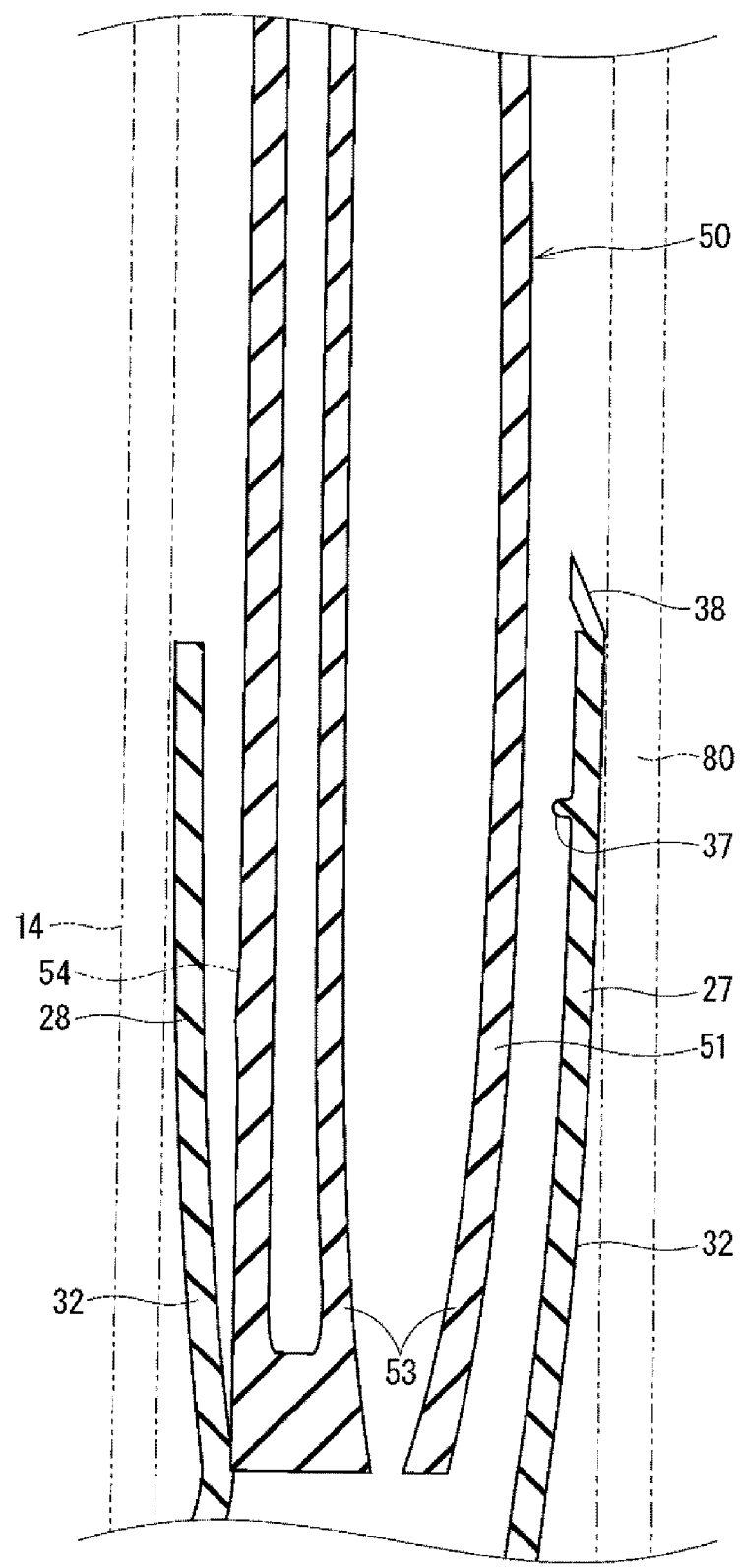
FIG. 10 is a cross-sectional view taken along line VII-VII in FIG. 9.
Figure 11:
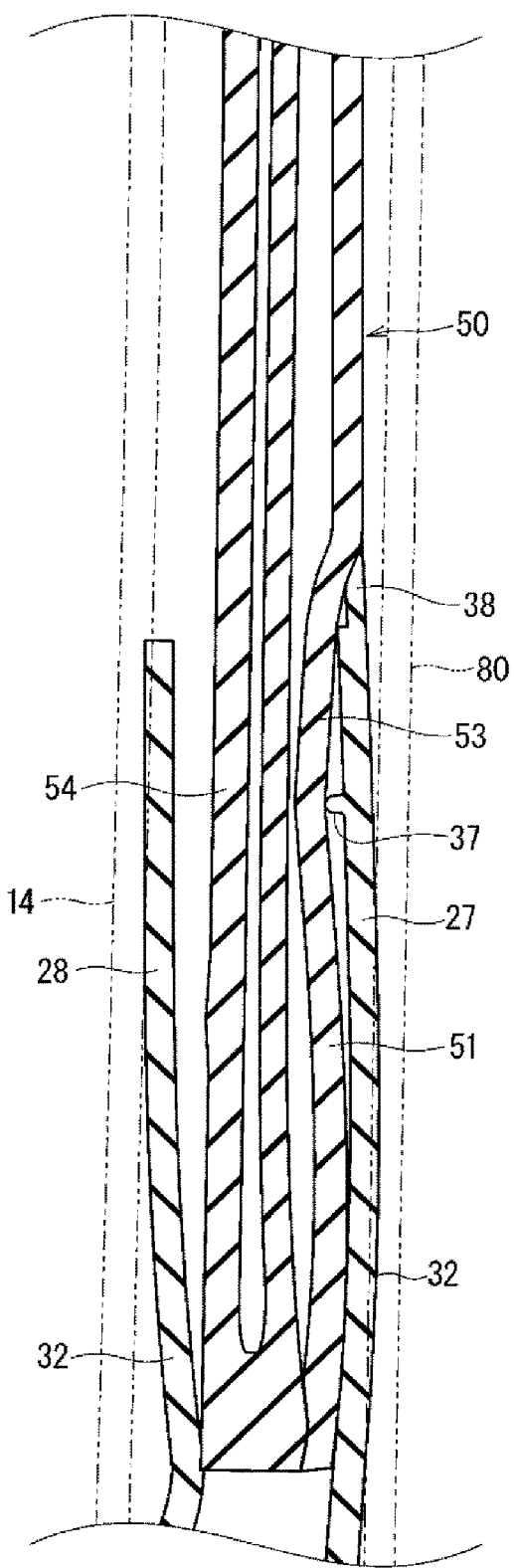
FIG. 11 is a cross-sectional view of the door component in an open door state.

Hereinafter, the door component will be described in detail with reference to FIGS. 2 to 11 in addition to FIG. 1. FIG. 2 is a perspective view of the door component according to the first embodiment. FIG. 3 is a front view of the door component according to the first embodiment. FIG. 4 is a side view of the door component according to the first embodiment. FIG. 5 is a bottom view of the door component according to the first embodiment. FIG. 6 is a rear view of the door component according to the first embodiment. FIG. 7 is a cross-sectional view taken along line VII-VII in FIG. 2. FIG. 8 is a cross-sectional view taken along line VIII-VIII in FIG. 2. FIG. 9 is an enlarged view of an area A1 in FIG. 3. FIG. 10 is a cross-sectional view taken along line VII-VII in FIG. 9. FIG. 11 is a cross-sectional view at the same position as in FIG. 10 and is a cross-sectional view of the door component in an open door state.

Grommet

In this example, the grommet 20 includes an outer member 21 and an inner member 44. The outer member 21 is a molded article made of an elastic material such as an elastomer. The inner member 44 is a molded article made of a resin or a metal. The inner member 44 is more rigid than the outer member 21. Here, the outer member 21 and the inner member 44 can be molded separately and then attached to each other.

The outer member 21 includes a door attachment part 22, a protective tubular part 40, and a vehicle body attachment part 42.

The door attachment part 22 is a part that is attached to the door panel 12. The door attachment part 22 is attached to the side plate part 16. The door attachment part 22 has a base part 23, a pullout tubular part 31, the first tubular part 32, the second tubular part 33, a weather strip replacement part 34, and flanges 38 and 39.

The base part 23 has a flat shape. The base part 23 is attached so as to expand over the surface of the side plate part 16. The base part 23 has a wiring housing part 24 and an extension part 25.

The wiring housing part 24 is a part that houses the wiring member 60. The wiring housing part 24 houses a portion of the wiring member 60 that extends along the side plate part 16. The wiring housing part 24 has a tubular shape. One opening of the wiring housing part 24 is open to one surface of the base part 23. The one opening of the wiring housing part 24 has a circular hole shape. The other opening of the wiring housing part 24 is open to the side surface of the base part 23. The other opening of the wiring housing part 24 has a flat elongated hole shape. The other opening of the wiring housing part 24 is in communication with the pullout tubular part 31. The extension part 25 is a part that expands outward from the peripheral edge of the wiring housing part 24.

As illustrated in FIG. 5, the base part 23 is partially formed as a hinge part 26 in an openable and closable manner. In this example, the hinge part 26 is a peripheral edge of the extension part 25 that is positioned on the inner side along the inward-outward direction of the vehicle and extends in the perpendicular direction. A vehicle body-side part 27 and a door-side part 28 of the base part 23 are connected via the hinge part 26. In the closed state, the vehicle body-side part 27 is positioned closer to the vehicle body 80 than the door-side part 28 is, and the door-side part 28 is positioned closer to the door panel 12 than the vehicle body-side part 27 is. The wiring housing part 24 is divided into the vehicle body-side part 27 and the door-side part 28. That is, a portion of the wiring housing part 24 is provided on the vehicle body-side part 27, and another part of the wiring housing part 24 is provided on the door-side part 28. The extension part 25 is also divided into the vehicle body-side part 27 and the door-side part 28. Since the base part 23 is openable and closable with the hinge part 26 serving as a starting point, it is easy to house the wiring member 60 in the wiring housing part 24 and the protective tubular part 40.

In this example, the portion of the wiring member 60 extending along the side plate part 16 is housed in the wiring housing part 24, and the portion of the wiring member 60 that bends and extends from the side plate part 16 toward the inner plate part 15 is housed in the pullout tubular part 31. In this example, the portion of the wiring member 60 housed in the wiring housing part 24 and the portion of the wiring member 60 housed in the pullout tubular part 31 are housed in the inner member 44. Accordingly, the wiring housing part 24 and the pullout tubular part 31 are formed so as to be capable of housing the inner member 44. The wiring housing part 24 and the pullout tubular part 31 are shaped in accordance with the shape of the inner member 44. The wiring housing part 24 can cover a one end side part of the inner member 44 from two sides. The wiring housing part 24 in the vehicle body-side part 27 is flat as shown in FIG. 2. One opening is formed in the wiring housing part 24 in the vehicle body-side part 27. The wiring housing part 24 in the door-side part 28 has a protruding shape as shown in FIG. 6. The pullout tubular part 31 allows the other end side portion of the inner member 44 to be inserted therein.

The extension part 25 is flat both in the vehicle body-side part 27 and in the door-side part 28. The vehicle body-side part 27 of the extension part 25 expands along the same plane as the vehicle body-side part 27 of the wiring housing part 24. The door-side part 28 of the extension part 25 expands flat from the peripheral edge of the door-side part 28 of the wiring housing part 24. The door-side part 28 of the wiring housing part 24 protrudes toward the door panel 12 relative to the door-side part 28 of the extension part 25.

The base part 23 has attachment holes 29. Bolts, clips, or the like are passed through the attachment holes 29. The bolts, clips, or the like passed through the attachment holes 29 are fastened or locked to the door panel 12 so that the base part 23 is attached to the door panel 12. In this example, the base part 23 has two attachment holes 29. The two attachment holes 29 are formed in the extension part 25. The two attachment holes 29 are separated between the upper side and the lower side in the vertical direction with respect to the wiring housing part 24. The two attachment holes 29 are formed so as to be positioned on the same side with respect to the first tubular part 32 and the second tubular part 33 (in this example, the outer side along the inward-outward direction of the vehicle).

The wiring housing part 24 has fitting holes 30. Two fitting holes 30 are formed in each of the vehicle body-side part 27 and the door-side part 28. The fitting holes 30 formed in the vehicle body-side part 27 and the fitting holes 30 formed in the door-side part 28 are formed at corresponding positions. Each fitting hole 30 is formed so as to be recessed from the inner space housing the wiring member 60 toward the one surface of the base part 23 (the surface of the vehicle body-side part 27) and the other surface of the base part 23 (the surface of the door-side part 28). In this example, the fitting holes 30 extend from the one surface to the other surface of the base part 23. The fitting holes 30 are formed such that protrusions 47 formed on the outer surface of the inner member 44 can be fitted thereto. Two fitting holes 30 at two positions are separated from each other in the perpendicular direction. The fitting holes 30 are formed at positions close to the hinge part 26 (slightly outward of the hinge part 26).

The pullout tubular part 31 is continuous with an edge part of the base part 23 forming the hinge part 26. The pullout tubular part 31 houses a portion of the wiring member 60 that is bent and extends from the side plate part 16 toward the inner plate part 15. The pullout tubular part 31 has a tubular shape whose transverse cross-section is flat and the central axis is bent. The pullout tubular part 31 is in communication with the wiring housing part 24. The pullout tubular part 31 is not opened or closed by the hinge part 26. When the base part 23 is opened at the hinge part 26 serving as a start point, the protective tubular part 40 and the tubular pullout tubular part 31 are aligned and extend on the same side as shown by the line-double-dash lines in FIG. 5. At this time, one opening of the pullout tubular part 31 appears at a position adjacent to the hinge part 26, between the vehicle body-side part 27 and the door-side part 28. Accordingly, the other end side portion of the inner member 44 can be easily inserted into the pullout tubular part 31.

The extension part 25 is provided with the first tubular part 32 and the second tubular part 33. The first tubular part 32 and the second tubular part 33 are divided between the upper side and the lower side in the perpendicular direction with respect to the wiring housing part 24. In this example, in a state where the grommet 20 is attached to the door 10, the first tubular part 32 is positioned on the upper side in the perpendicular direction, and the second tubular part 33 is positioned on the lower side in the perpendicular direction, with respect to the wiring housing part 24. The first tubular part 32 and the second tubular part 33 extend in the perpendicular direction. The first tubular part 32 is open upward in the perpendicular direction, and the second tubular part 33 is open downward in the perpendicular direction. In this example, the opening portion of the first tubular part 32 and the opening portion of the second tubular part 33 are shifted from each other along the inward-outward direction of the vehicle. The opening portion of the first tubular part 32 is positioned outward of the opening portion of the second tubular part 33 along the inward-outward direction of the vehicle. The first tubular part 32 and the second tubular part 33 are bent gently while extending between the opening portion of the first tubular part 32 and the opening portion of the second tubular part 33. The opening portion of the first tubular part 32 and the opening portion of the second tubular part 33 may be provided at the same position along the inward-outward direction of the vehicle.

FIG. 8 illustrates a transverse cross-sectional shape of the second tubular part 33. Hereinafter, the transverse cross-sectional shape of the second tubular part 33 will be described with reference to FIG. 8. However, the transverse cross-sectional shape of the first tubular part 32 is also formed similarly to the transverse cross-sectional shape of the second tubular part 33. As shown in FIG. 8, the second tubular part 33 is divided into the vehicle body-side part 27 and the door-side part 28 similarly to the base part 23. In the vehicle body-side part 27, the second tubular part 33 protrudes from the extension part 25 to above the surface of the extension part 25. In the door-side part 28, the second tubular part 33 protrudes from the extension part 25 to above the surface of the extension part 25. The thickness of the second tubular part 33 is similar to the thickness of the extension part 25. In the second tubular part 33, the amount of protrusion of the vehicle body-side part 27 from the extension part 25 is larger than the amount of protrusion of the door-side part 28 from the extension part 25. Most of the weather strip 50 is fitted into the vehicle body-side part 27 of the second tubular part 33. The door-side part 28 of the second tubular part 33 covers the vehicle body-side part 27. In the closed state, the second tubular part 33 is crushed together with the weather strip 50.

The weather strip replacement part 34 is a portion that water-seals the section where the weather strip 50 is interrupted, in place of the weather strip 50. In this example, the weather strip replacement part 34 connects the first tubular part 32 and the second tubular part 33. The weather strip replacement part 34 has a vehicle body-facing protruding part 35 and a door-facing protruding part 36. The vehicle body-facing protruding part 35 and the door-facing protruding part 36 are elastically deformable so as to be crushed. As shown in FIG. 7, the thickness of the vehicle body-facing protruding part 35 and the thickness of the door-facing protruding part 36 are each similar to the thickness of the base part 23. Accordingly, the inside of the vehicle body-facing protruding part 35 and the inside of the door-facing protruding part 36 are hollow.

The vehicle body-facing protruding part 35 protrudes from the base part 23 toward the vehicle body 80. The vehicle body-facing protruding part 35 elastically deforms so as to be crushed in the closed state, and elastically returns in the open state. The vehicle body-facing protruding part 35 connects the first tubular part 32 and the second tubular part 33 in the vehicle body-side part 27. The vehicle body-facing protruding part 35 is formed in a size and shape similar to those of the first tubular part 32 and the second tubular part 33 in the vehicle body-side part 27. Therefore, in the vehicle body-side part 27, a groove with a uniform transverse cross-sectional shape is formed so as to traverse the base part 23. One end part of the groove constitutes the vehicle body-side part 27 of the first tubular part 32. The other end part of the groove constitutes the vehicle body-side part 27 of the second tubular part 33. The intermediate part of the groove constitutes the vehicle body-facing protruding part 35.

The door-facing protruding part 36 protrudes from the base part 23 toward the door panel 12. The door-facing protruding part 36 is constantly in a crushed state while the grommet 20 is attached to the door panel 12. The door-facing protruding part 36 connects the first tubular part 32 and the second tubular part 33 in the door-side part 28. One end part of the door-facing protruding part 36 is connected to the first tubular part 32 in the extension part 25 on the upper side of the wiring housing part 24. The other end part of the door-facing protruding part 36 is connected to the second tubular part 33 in the extension part 25 on the lower side of the wiring housing part 24. The intermediate part of the door-facing protruding part 36 traverses the wiring housing part 24. The door-facing protruding part 36 is formed so as to be larger than the door-side part 28 in the first tubular part 32 and the second tubular part 33. The door-facing protruding part 36 has the same size and shape as those of the vehicle body-facing protruding part 35, and is formed in line symmetry with the vehicle body-facing protruding part 35. Therefore, in the door-side part 28, a groove with a varying transverse cross-sectional shape is formed so as to traverse the base part 23. One end part of the groove constitutes the door-side part 28 of the first tubular part 32. The other end part constitutes the door-side part 28 of the second tubular part 33. The intermediate part of the groove constitutes the door-facing protruding part 36. The size of the intermediate part of the groove is larger than the size of the one end part and the other end part of the groove.

As shown in FIG. 7, the inner member 44 is interposed between the vehicle body-facing protruding part 35 and the door-facing protruding part 36. The inner member 44 supports deformation of the vehicle body-facing protruding part 35 and the door-facing protruding part 36.

The first tubular part 32 is provided with a lip 37 formed on the inner surface thereof (see FIGS. 8 to 11). The lip 37 is formed on at least the vehicle body-side part 27 of the inner surface of the first tubular part 32. The lip 37 is formed so as to extend in the circumferential direction of the inner surface of the first tubular part 32. In this example, the lip 37 is provided on the vehicle body-side part 27 and not on the door-side part 28. Thus, the lip 37 has one end part and another end part in the circumferential direction. The lip 37 is formed at a portion of the weather strip 50 facing a tubular part 53 described later. In the closed state, the lip 37 locally crushes a portion of the first end part 51 of the weather strip 50 along the longitudinal direction (see FIG. 11). The second tubular part 33 is also provided with a similar lip 37 on the inner surface thereof (see FIG. 3). In the closed state, the lip 37 provided on the second tubular part 33 locally crushes a portion of the second end part 52 of the weather strip 50 along the longitudinal direction.

A flange 38 extends from the vehicle body-side part 27 in the opening portion of the first tubular part 32. The flange 38 is formed so as to extend outward from the vehicle body-side part 27 at the opening edge of the first tubular part 32. The flange 38 protrudes diagonally toward the weather strip 50 from the first tubular part 32 as it extends outward of the axial direction of the first tubular part 32. As shown in FIG. 11, the flange 38 is in intimate contact with the outer surface of the crushed weather strip 50 in the closed state. In this example, particularly, the flange 38 is in intimate contact with the outer surface of the weather strip 50 that is crushed and curved by the lip 37 in the closed state. The second tubular part 33 is also provided with a flange 38 similarly to the first tubular part 32.

More specifically, the flange 38 is formed to be thinner than the first tubular part 32. The flange 38 protrudes in the radial direction from the outer surface side of the first tubular part 32. Accordingly, the leading end part of the flange 38 elastically deforms outward of the radial direction of the first tubular part 32, with the base end part connected to the first tubular part 32 serving as a fulcrum. The leading end part of the flange 38 is shaped so as to be cut diagonally with respect to the axial direction of the first tubular part 32 from the inner side toward the outer side of the first tubular part 32. Accordingly, the leading end part of the flange 38 has a large leading end surface in comparison with the case where the leading end part of the flange 38 is cut in a direction orthogonal to the axial direction of the first tubular part 32. A portion of the weather strip 50 adjacent to the portion crushed by the lip 37 along the longitudinal direction is curved so as to bulge toward the vehicle body 80. The curved portion comes into contact with the flange 38 and presses the leading end part outward. Accordingly, the leading end part of the flange 38 comes into intimate contact with the curved portion. The leading end surface of the flange 38 is preferably shaped to extend from the inner side toward the outer side of the first tubular part 32 so that the leading end surface of the flange 38 comes into surface contact with the outer surface of the weather strip 50.

Since the flange 38 is thinner than the first tubular part 32, a height difference at the boundary between the first tubular part 32 and the flange 38 is small. Thus, the weather strip 50 can fill the height difference between the first tubular part 32 and the flange 38 with little elastic deformation thereof (for example, elastic deformation of the tubular part 53). As described above, in combination with the diagonally cut shape of the leading end part of the flange 38, the weather strip 50 can come into contact with the first tubular part 32 and the flange 38 with the smallest gap possible.

FIGS. 10 and 11 are cross-sectional views of a bending and extending portion of the weather strip 50 taken along a straight line (line X-X in FIG. 9). In the closed state shown in FIG. 11, there is a gap between the vehicle body 80 and the first tubular part 32 and the weather strip 50 that extends along the longitudinal direction of the weather strip 50. However, the vehicle body 80 and the first tubular part 32 and the weather strip 50 come into intimate contact with each other at a portion different from the portion with the gap shown in the cross section of FIG. 11 extending along the circumferential direction of the weather strip 50. That is, the cross section in FIG. 11 includes the portion slightly shifted from the portion where the vehicle body 80, the first tubular part 32, and the weather strip 50 are in intimate contact with each other. In actuality, along the longitudinal direction of the weather strip 50, the vehicle body 80, the grommet 20, and the weather strip 50 are continuously in the intimate contact state. In addition, the presence of the flange 38 at a boundary portion between the grommet 20 and the weather strip 50 (near the opening portion of the first tubular part 32) reduces the distance to the vehicle body 80.

The flange 39 is provided at the outer edge of the base part 23. The flange 39 is provided at the outer edge of the vehicle body-side part 27 in the base part 23. The flange 39 is connected to the flange 38 provided outside of the first tubular part 32 and the flange 38 provided outside of the second tubular part 33. The flange 39 protrudes diagonally toward the door 10. The thickness of the flange 39 is smaller than the thickness of the base part 23, and is similar to the thickness of the flanges 38. The flange 39 protrudes toward the door 10 relative to the door-side part 28 of the base part 23. In the state in which the grommet 20 is attached to the door panel 12, the flange 39 is elastically deformed along the door panel 12 and is in intimate contact with the door panel 12.

In the closed state shown in FIG. 11, there is a gap between the door panel 12 and the first tubular part 32 and the weather strip 50 that extends along the longitudinal direction of the weather strip 50. This is because, as described above, FIG. 11 is a cross-sectional view of the bending and extending portion of the weather strip 50 taken along a straight line (line X-X in FIG. 9). Similar to the intimate contact state between the vehicle body 80 and the grommet 20 and the weather strip 50, the intimate contact state between the door panel 12 and the grommet 20 and the weather strip 50 is continuous along the longitudinal direction of the weather strip 50. At the boundary portion between the grommet 20 and the weather strip 50 (near the opening portion of the first tubular part 32), the flanges 38 and 39 come into intimate contact with the circumference of the weather strip 50, and the flange 39 comes into intimate contact with the door panel 12, whereby the intrusion of water is suppressed.

The protective tubular part 40 is provided so as to protrude toward the surface of the vehicle body-side part 27 in the wiring housing part 24. The protective tubular part 40 is in communication with the wiring housing part 24. The protective tubular part 40 is formed so as to have flexibility. Any configuration may be employed to impart flexibility to the protective tubular part 40. In this example, the protective tubular part 40 is imparted with flexibility by being formed in a bellows shape.

The vehicle body attachment part 42 is provided at the other end part of the protective tubular part 40. In this example, the vehicle body attachment part 42 is provided so as to be lockable to a through hole in the vehicle body 80.

The inner member 44 has a flat tubular shape. The inner member 44 includes a first component 45 and a second component 46. The first component 45 and the second component 46 are molded separately. The first component 45 and the second component 46 are combined after molding. In the closed state, the first component 45 is positioned closer to the vehicle body 80 than the second component 46 is, and the second component 46 is positioned closer to the door panel 12 than the first component 45 is.

The first component 45 has a flat plate part 45a and a peripheral wall part 45b. The peripheral wall part 45b is formed at the peripheral edge of the flat plate part 45a. The flat plate part 45a has a semi-circular shape at one end part and has a rectangular shape from an intermediate part to the other end part. The flat plate part 45a is bent such that parallel surfaces intersect each other midway between the intermediate part and the other end part. The peripheral wall part 45b is formed so as to protrude on one main surface of the flat plate part 45a. The peripheral wall part 45b is formed on the flat plate part 45a excluding the other end part. One opening of the inner member 44 is formed at the one end part of the flat plate part 45a. The one opening of the inner member 44 is formed at a position corresponding to the one opening of the wiring housing part 24.

The second component 46 has a flat plate part 46a, a side wall part 46b, and a peripheral wall part 46c. The side wall part 46b is formed at the peripheral edge of the flat plate part 46a, and the peripheral wall part 46c is formed at the peripheral edge of the side wall part 46b. The flat plate part 46a is formed in a shape corresponding to the flat plate part 45a. The flat plate part 46a is formed to be smaller than the flat plate part 45a. The flat plate part 46a and the flat plate part 45a are spaced apart while being parallel to each other. The wiring member 60 is housed between the flat plate part 46a and the flat plate part 45a. The side wall part 46b extends diagonally so as to intersect the flat plate part 46a. The peripheral wall part 46c is formed so as to protrude on one main surface of the side wall part 46b. The side wall part 46b and the peripheral wall part 46c are formed on a portion of the flat plate part 46a excluding the other end portion. In this example, the peripheral edge of the second component 46 is surrounded by the peripheral wall part 45b of the first component 45. The space between the first component 45 and the second component 46 at the other end part of the inner member 44 constitutes the other opening of the inner member 44.

With respect to the base part 23, the first component 45 faces the vehicle body-side part 27, and the second component 46 faces the door-side part 28. The protrusions 47 are formed on the outer surfaces of the first component 45 and the second component 46. The protrusions 47 on the first component 45 are fitted into the fitting holes 30 in the vehicle body-side part 27. The protrusions 47 on the second component 46 are fitted into the fitting holes 30 in the door-side part 28. For example, the protrusions 47 may be formed to be slightly larger than the fitting holes 30 and be press-fitted into the fitting holes 30.

Weather Strip

As shown in FIG. 8, the weather strip 50 includes the tubular part 53 and an attachment part 54. In the closed state, the tubular part 53 is a part that is elastically deformed between the door panel 12 and the vehicle body 80 and is in intimate contact with the vehicle body 80. The attachment part 54 is a part that is attached to the door panel 12. The first end part 51 of the weather strip 50 is fitted into the first tubular part 32, and the second end part 52 of the weather strip 50 is fitted into the second tubular part 33. Of the weather strip 50, a portion extending from the first end part 51 to the outside of the grommet 20 and a portion extending from the second end part 52 to the outside of the grommet 20 are attached to the door panel 12 using the attachment part 54. For example, the attachment part 54 is formed in a plate shape and attached to the side plate part 16 using a clip or the like. For example, the attachment part 54 is fitted into a recessed portion in the door panel 12. The weather strip 50 is a molded article made of an elastic material such as an elastomer. The weather strip 50 is formed by cutting an elongated linear extrusion-molded member to a necessary length, for example. In this case, the weather strip 50 has a continuously uniform cross section.

The weather strip 50 surrounds the peripheral edge of the door 10. The length of the weather strip 50 is slightly shorter than the length of the peripheral edge of the door panel 12. Thus, there is a section where the weather strip 50 is interrupted between the first end part 51 and the second end part 52 of the weather strip 50. In the section where the weather strip 50 is interrupted, the weather strip replacement part 34 is provided in the grommet 20. The length of the section where the weather strip 50 is interrupted is longer than the length of the first end part 51 of the weather strip 50 inserted into the first tubular part 32.

As shown in FIG. 8, in a state in which the first end part 51 is fitted into the first tubular part 32, the attachment part 54 of the weather strip 50 protrudes toward the door 10 relative to the vehicle body-side part 27 of the extension part 25. In addition, as shown in FIG. 7, the inner member 44 is housed between the vehicle body-side part 27 and the door-side part 28 in the portion where the weather strip replacement part 34 is provided. Accordingly, if the first end part 51 of the weather strip 50 is excessively inserted into the first tubular part 32, the leading end portion of the first end part 51 (in this example, the leading end portion of the attachment part 54) comes into contact with the inner member 44. This suppresses the first end part 51 from being further inserted into the first tubular part 32. Similar applies to the case of inserting the second end part 52 into the second tubular part 33.

Wiring Member

The intermediate portion of the wiring member 60 is passed through the grommet 20. At a portion of the wiring member 60 inserted into the protective tubular part 40, the plurality of electrical wires 62 are bound such that the transverse cross-sectional shape thereof is brought closer as much as possible to a circular shape. Accordingly, the portion of the wiring member 60 inserted into the protective tubular part 40 can bend in response to bending of the protective tubular part 40. At a portion of the wiring member 60 housed in the inner member 44, the plurality of electrical wires 62 are aligned in one direction (in this example, a perpendicular direction) in a flat manner. The wiring member 60 changes from the circular shape to the flat shape in the vicinity of the coupling portion between the protective tubular part 40 and the inner member 44.

The wiring member 60 passes through the grommet 20 so as to overlap the weather strip replacement part 34. In the front view of FIG. 3, the wiring member 60 in the base part 23 is positioned between the first end part 51 and the second end part 52 of the weather strip 50.

A component obtained by attaching the weather strip 50 to the grommet 20 is a door component. This door component may be conveyed to a door assembly plant (vehicle assembly plant) and attached to the door panel 12. The wiring member 60 may be provided in the door component. The wiring member 60 is passed through the grommet 20 to form a wiring module. The wiring module and the weather strip 50 may be separately conveyed to a door assembly plant (vehicle assembly plant) and attached to the door panel 12.

Advantageous Effects of First Embodiment

According to the grommet 20 and the door component or wiring module including the grommet 20 configured as described above, the first end part 51 of the weather strip 50 is fitted into the first tubular part 32, and the second end part 52 is fitted into the second tubular part 33. Accordingly, end parts of the weather strip 50 attached first to the door panel 12 may be fitted into the grommet 20 attached later to the door panel 12, the end parts of the weather strip 50 attached later to the door panel 12 may be fitted into the grommet 20 attached first to the door panel 12, or the grommet 20 and the weather strip 50 in a state where the end parts of the weather strip 50 are fitted into the grommet 20 may be attached together to the door panel 12. This improves the ease of attaching the door component to the door panel 12.

In the closed state, the lip 37 is provided on the grommet 20 to locally crush a portion of the first end part 51 of the weather strip 50. This improves the sealing properties between the grommet 20 and the weather strip 50.

In the closed state, the flange 38 is in intimate contact with the outer surface of the crushed weather strip 50. This improves the sealing properties between the grommet 20 and the weather strip 50.

The grommet 20 is provided with the weather strip replacement part 34. This enables shortening of the weather strip 50. The weather strip replacement part 34 includes the vehicle body-facing protruding part 35 and the door-facing protruding part 36. In the closed state, the vehicle body-facing protruding part 35 and the door-facing protruding part 36 are crushed, thereby enhancing the water-sealing properties of the weather strip replacement part 34.

The wiring member 60 passes through the grommet 20 so as to overlap the weather strip replacement part 34. This suppresses the wiring member 60 from contributing to the crushing of the weather strip 50, so that the weather strip 50 can be crushed in a stable manner.

The weather strip 50 is formed continuously from the first end part 51 to the second end part 52 so as to be capable of surrounding the peripheral edge of the door panel 12. Accordingly, even if the weather strip 50 has an annular shape that surrounds the peripheral edge of the door panel 12, the linear weather strip 50 can be bent and used as it is, and thus there is no need to use an endless annular weather strip 50. In the case of forming a weather strip 50 with an endless annular shape, in general, an elongated extrusion molded weather strip is cut, and then one end part and the other end part of the weather strip are connected to each other through bonding or welding. In contrast to this, the weather strip 50 in the present example can be used in an elongated linear shape, which eliminates the need for a process of forming the weather strip 50 in an endless annular shape.

Second Embodiment

Figure 12:
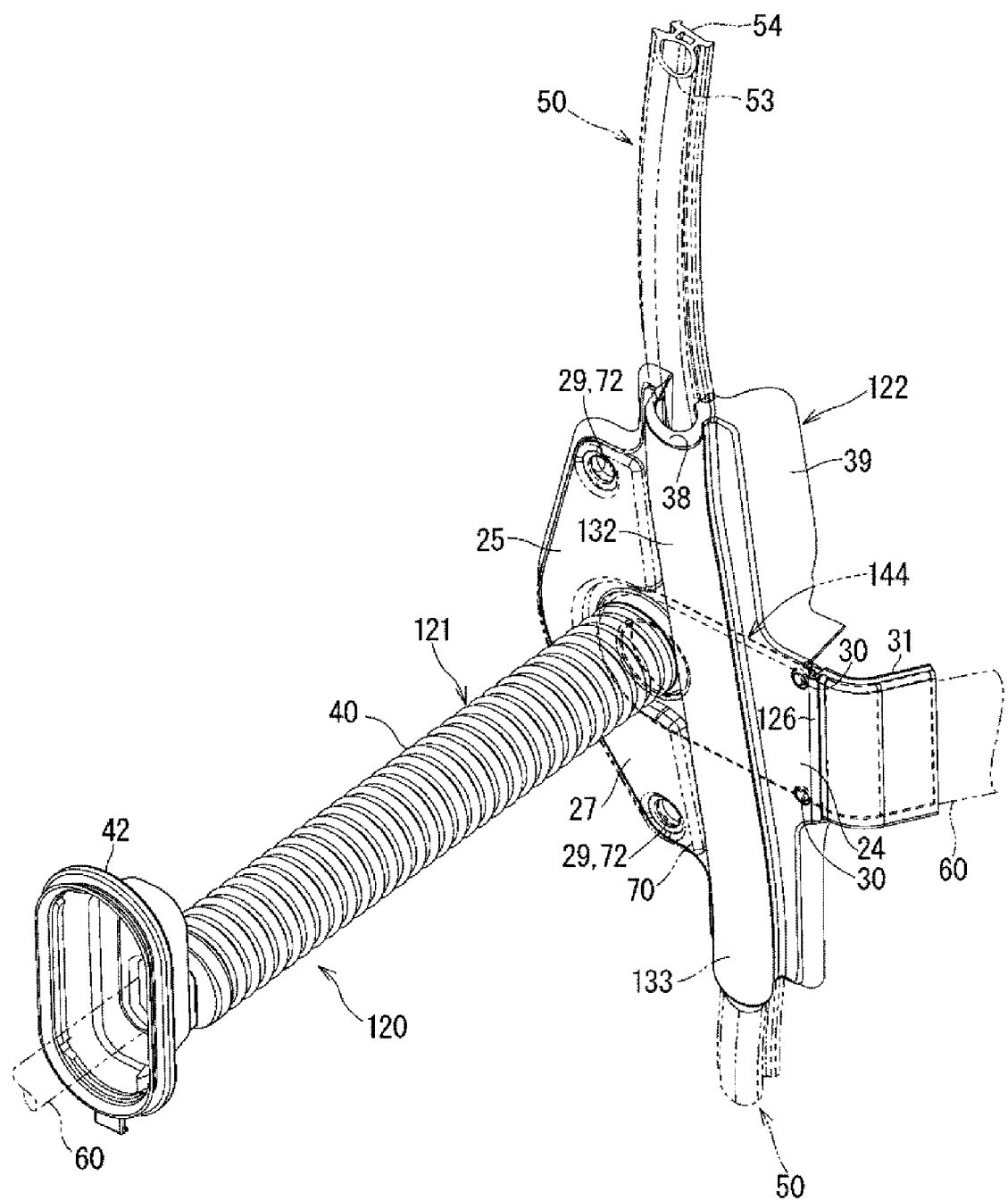
FIG. 12 is a perspective view of a door component according to a second embodiment.
Figure 13:
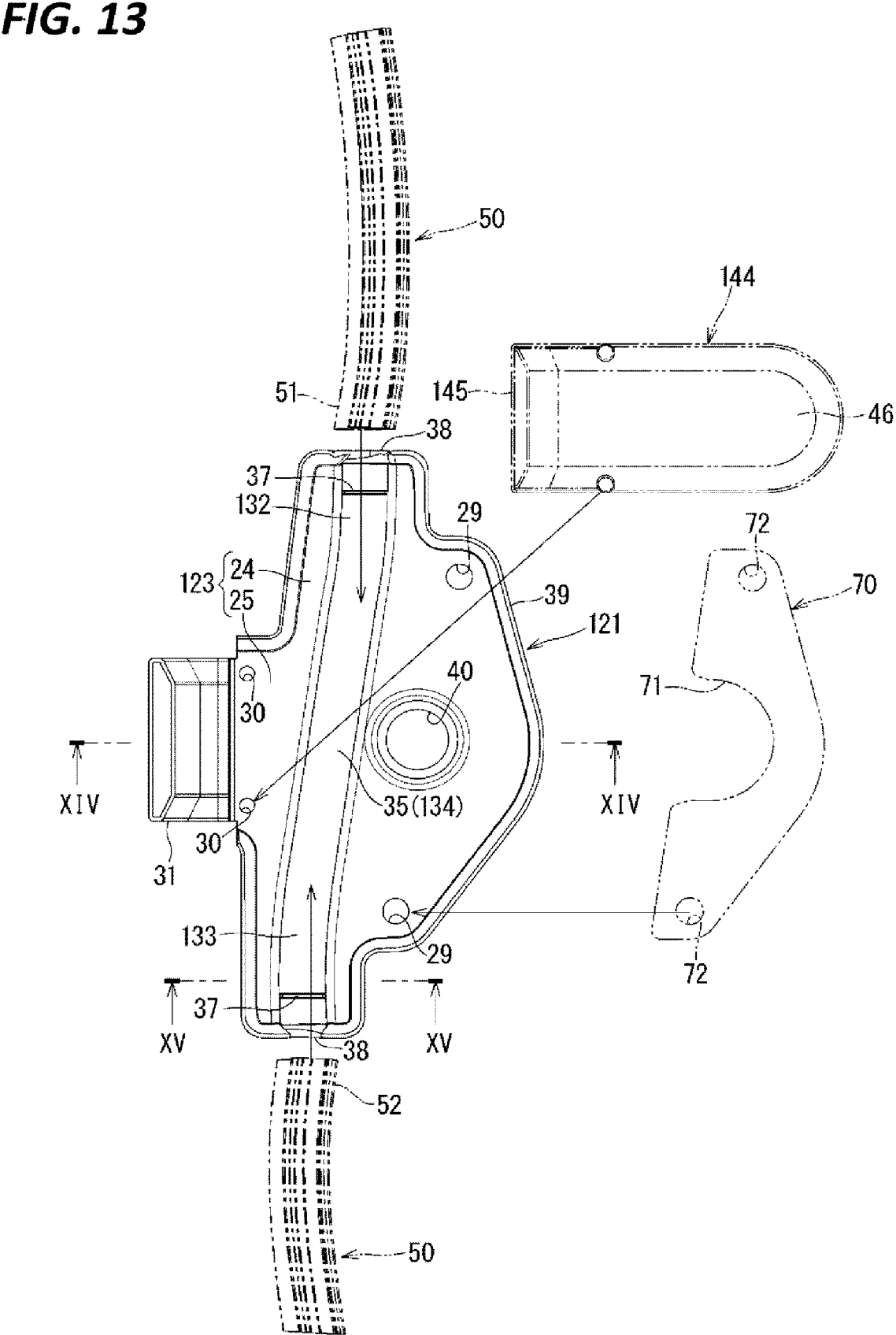
FIG. 13 is an exploded rear view of the door component according to the second embodiment.
Figure 14:
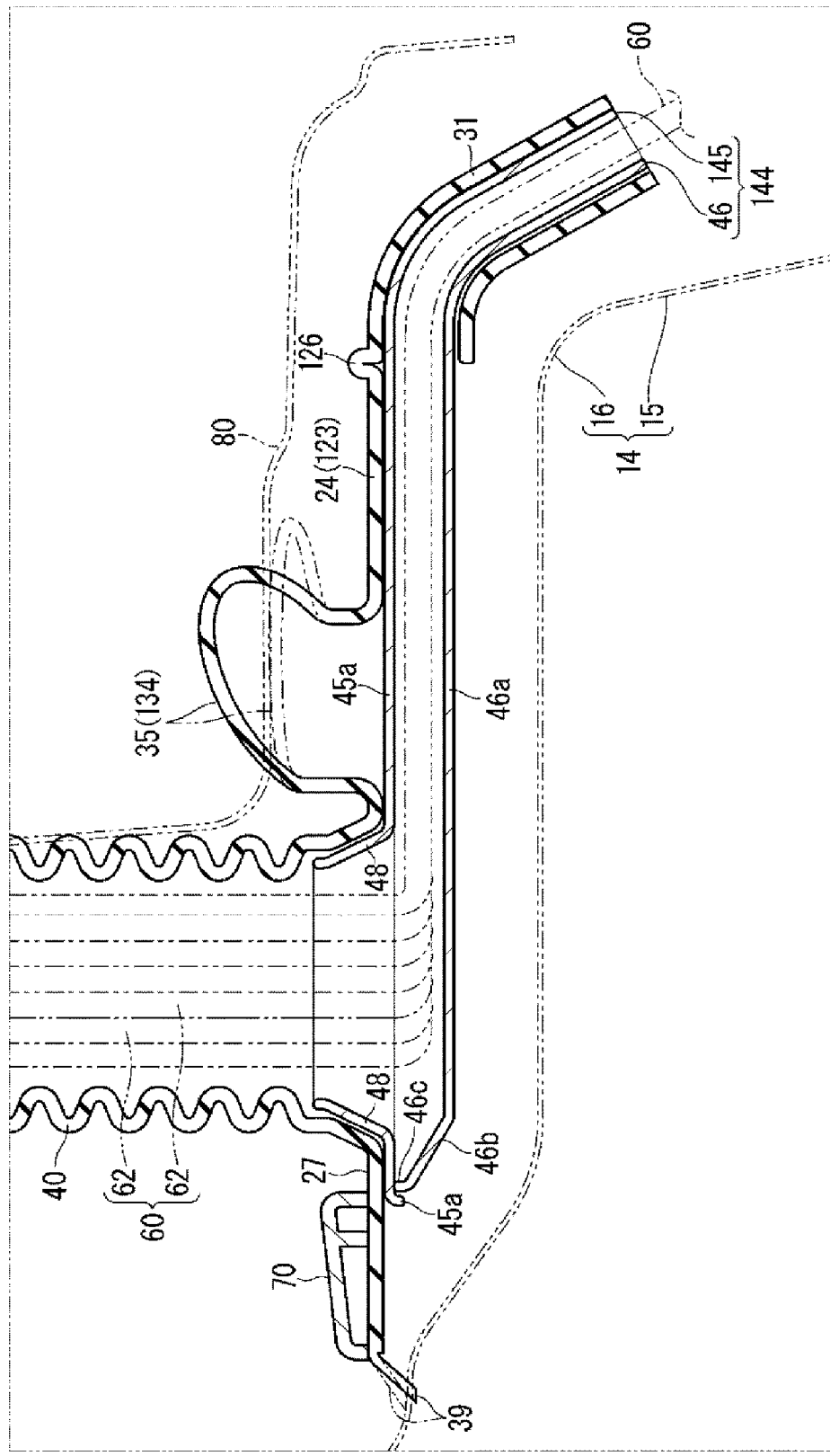
FIG. 14 is a cross-sectional view taken along line XIV-XIV in FIG. 13.
Figure 15:
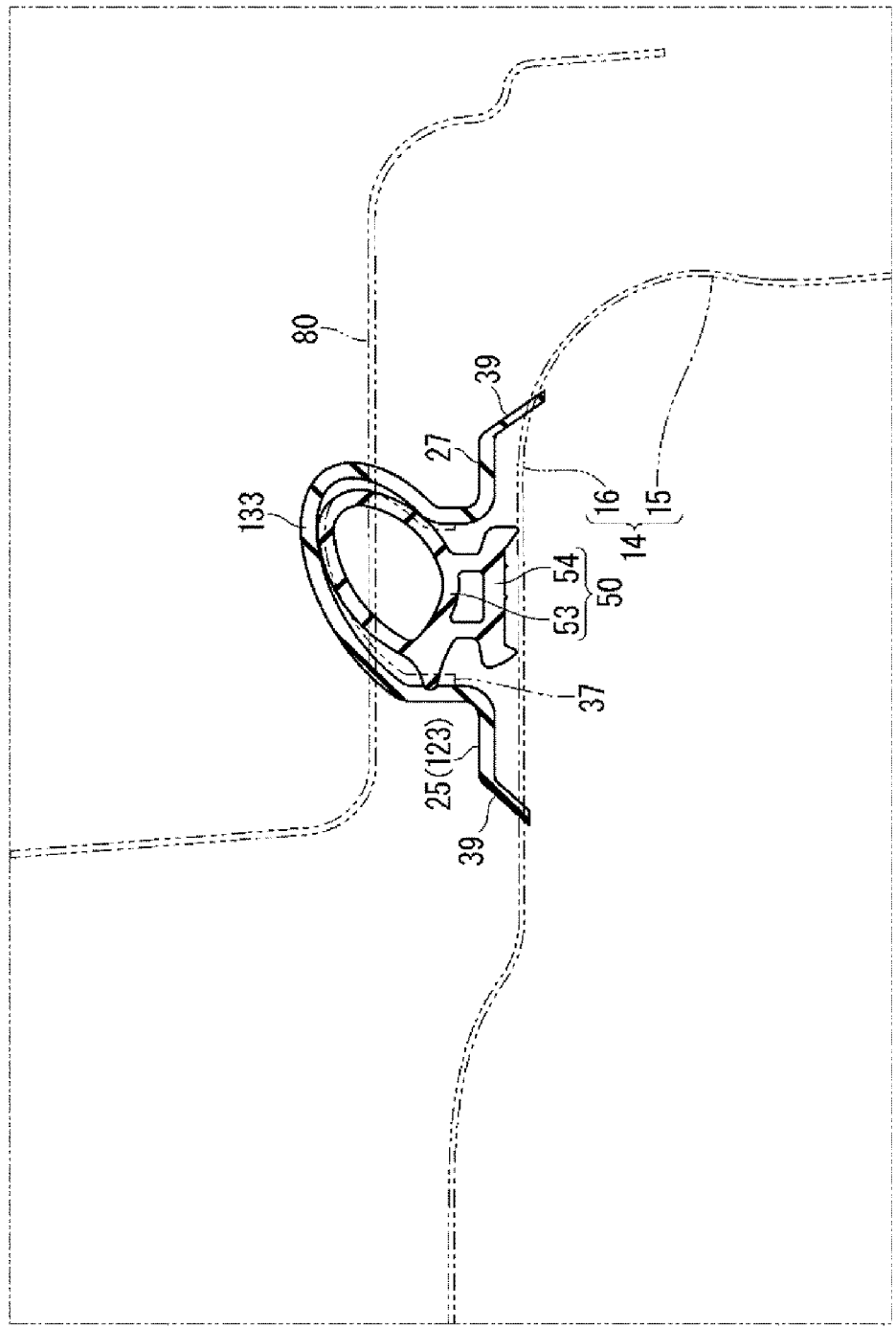
FIG. 15 is a cross-sectional view taken along line XV-XV in FIG. 13.

A door component, a grommet, and a wiring module according to a second embodiment will be described. FIG. 12 is a perspective view of the door component according to the second embodiment. FIG. 13 is an exploded rear view of the door component according to the second embodiment. FIG. 14 is a cross-sectional view taken along line XIV-XIV in FIG. 13. FIG. 15 is a cross-sectional view taken along line XV-XV in FIG. 13. In the description of the present embodiment, components similar to those described above are given identical reference signs and description thereof will be omitted.

In the door component according to the second embodiment, the shape of an outer member 121 of a grommet 120 is different from the shape of the outer member 21 of the grommet 20. In the outer member 21, the base part 23 of the door attachment part 22 is formed such that two plate members overlap, and the joint between the two plate members is formed as the hinge part 26 such that the two plate members are openable/closable. In contrast to this, in the outer member 121, a base part 123 in a door attachment part 122 is formed in the shape of a single plate so as not to be openable or closable.

More specifically, the base part 123 includes a vehicle body-side part 27 similarly to the base part 23. The door-side part 28 provided on the base part 23 is not provided on the base part 123. A weather strip replacement part 134 has a vehicle body side-facing convex part 35 similarly to the weather strip replacement part 34. The door-facing protruding part 36 provided on the weather strip replacement part 34 is not provided in the weather strip replacement part 134. Thus, as shown in FIG. 14, an inner member 144 is exposed on the door panel 12 side with respect to the base part 123.

Since the door attachment part 122 is not provided with the door-side part 28, a first tubular part 132 and a second tubular part 133 have a semi-tubular shape. Thus, as shown in FIG. 15, the first end part 51 of the weather strip 50 inserted into the first tubular part 132 and the second end part 52 of the weather strip 50 inserted into the second tubular part 133 are in contact with the door panel. The semi-tubular shape here refers to a shape that surrounds only a portion of the weather strip 50 along the circumferential direction thereof, and is not necessarily required to be half a tubular shape. The first tubular part 132 and the second tubular part 133 surround half or more of the tubular part 53 of the weather strip 50 (in this example, the entire circumference of a portion of the tubular part 53 not connected to an attachment part 54). Accordingly, the weather strip 50 inserted into the first tubular part 132 and the second tubular part 133 is less likely to come loose from the first tubular part 132 and the second tubular part 133 in a direction intersecting the axial directions thereof.

In the door component of the present example, the shape of the inner member 144 of the grommet 120 is different from the shape of the inner member 44 of the grommet 20. A first component 145 of the inner member 144 also has a rib 48. The inner member 144 is the same as the inner member 44 except for the rib 48. The inner member 144 with the rib 48 may be applied to the door component in the first embodiment.

The rib 48 is provided at the peripheral edge of an opening at one end portion of the flat plate part 45*a* (an opening for guiding the wiring member 60 to the protective tubular part 40). The rib 48 is fitted to the base end portion of the protective tubular part 40. In the inner member 144, protrusions 47 are fitted into fitting holes 30 similarly to the inner member 44. Accordingly, even when the inner member 144 is exposed with respect to the base part 123, the inner member 144 is unlikely to shift from the base part 123. The rib 48 partially or entirely surrounds an opening of the flat plate part 45*a* along the circumferential direction. In this example, the rib 48 is formed in a cylindrical shape that surrounds the entire opening of the flat plate part 45*a* along the circumferential direction. The base end portion of the rib 48 is connected to the flat plate part 45*a*. The rib 48 gradually separates from the flat plate part 45*a* and shrinks in diameter from the base end portion to the leading end portion. This suppresses the wiring member 60 from strongly rubbing against the peripheral edge of the opening in the flat plate part 45*a*.

In the outer member 121, a hinge part 126 is provided between the base part 123 and the pullout tubular part 31. The hinge part 126 extends in a direction orthogonal to the axial direction of the pullout tubular part 31. Due to the provision of the hinge part 126, the base part 123 and the pullout tubular part 31 can be easily bent. After the one end portion of the inner member 144 is inserted into the pullout tubular part 31, the pullout tubular part 31 is bent at the position of the hinge part 126, and the rib 48 at the other end portion of the inner member 144 is fitted into the protective tubular part 40.

The door component of the present example also includes a reinforcement plate 70. The reinforcement plate 70 is a molded article made of resin or metal, for example. The reinforcement plate 70 is disposed on the surface of the door-side part 28. The reinforcement plate 70 surrounds a portion of the surrounding region of the protective tubular part 40. In this example, the reinforcement plate 70 has a recessed shape in a plan view. The base end portion of the protective tubular part 40 is fitted into a recessed part 71 of the reinforcement plate 70.

The outer edge of the reinforcement plate 70 is separated from the first tubular part 132, the second tubular part 133, the vehicle body-facing protruding part 35, and the protective tubular part 40. This suppresses the reinforcement plate 70 from interfering with the deformation of the first tubular part 132, the second tubular part 133, the vehicle body-facing protruding part 35, and the protective tubular part 40.

The reinforcement plate 70 has attachment holes 72. The attachment holes 72 are provided at positions corresponding to attachment holes 29. The reinforcement plate 70 is fixed to the door panel 12 together with the grommet 120 by bolts or the like inserted into the attachment holes 29 and 72. The reinforcement plate 70 may be applied to the door component in the first embodiment.

Figure 16:
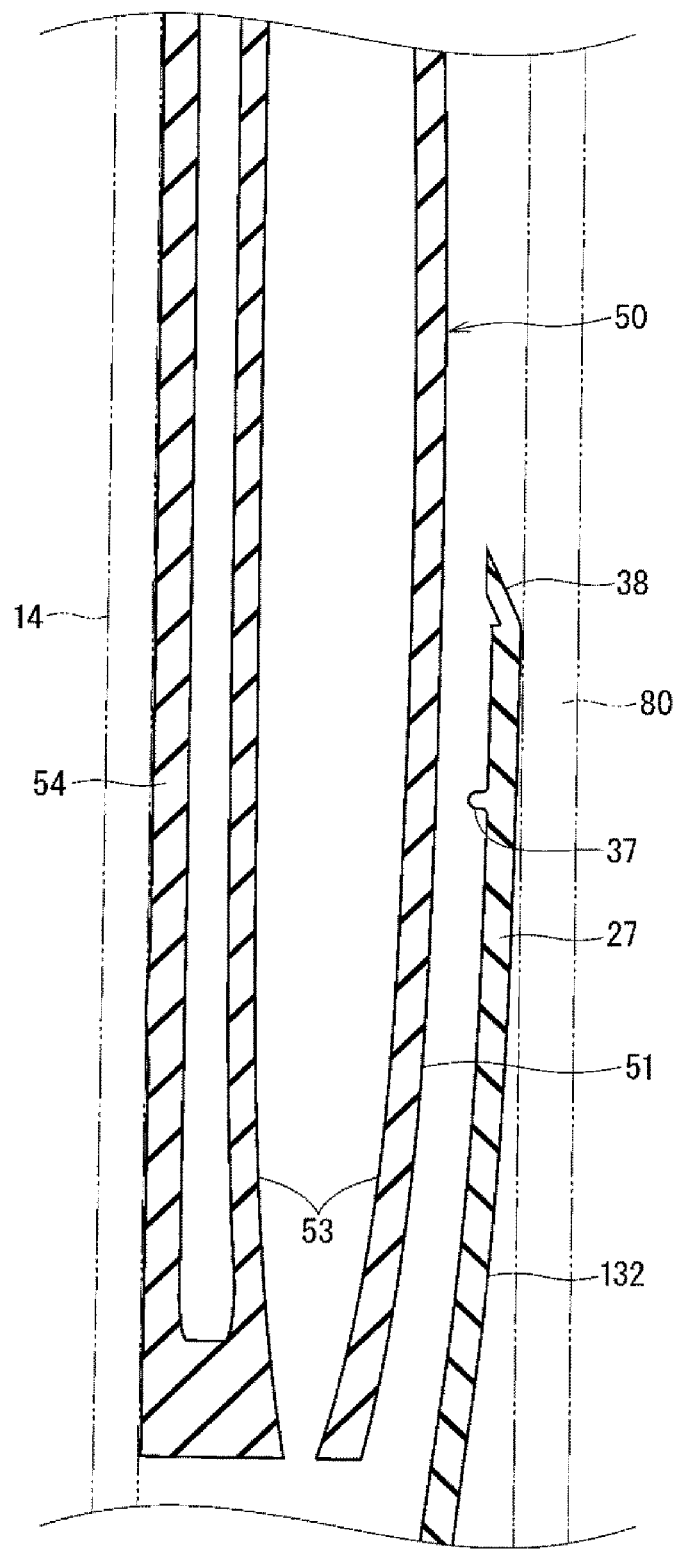
FIG. 16 is a cross-sectional view of the door component in an open door state.
Figure 17:
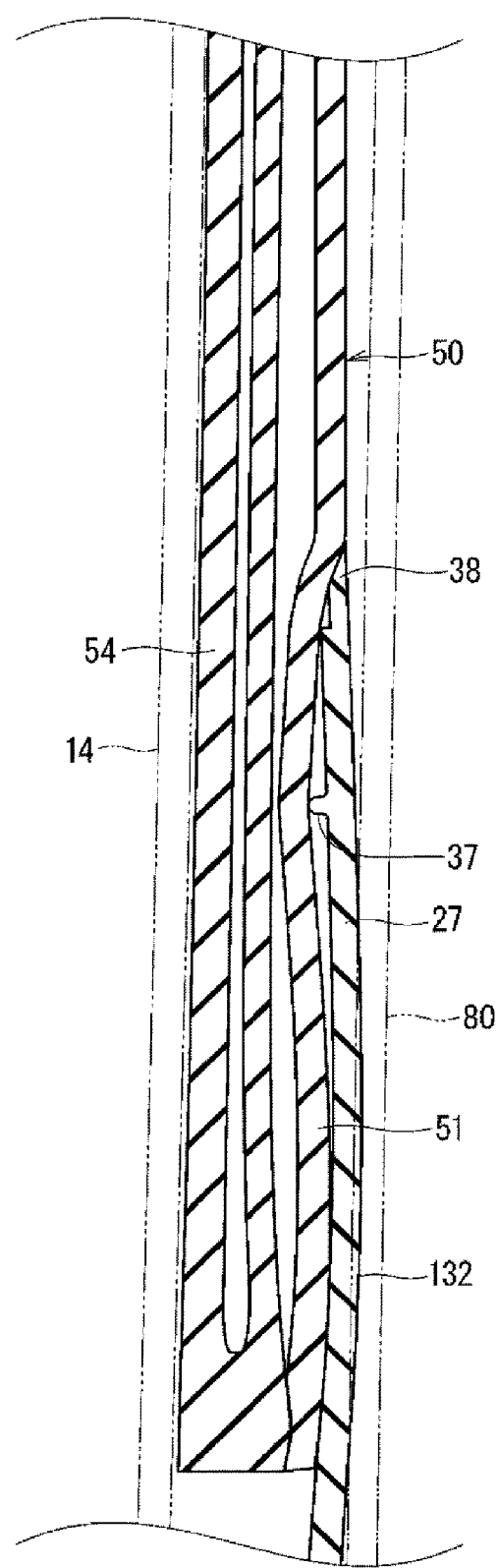
FIG. 17 is a cross-sectional view of the door component in a closed door state.

FIG. 16 is a cross-sectional view of the door component in an open door state. FIG. 17 is a cross-sectional view of the door component in a closed door state. FIGS. 16 and 17 are cross-sectional views at the same positions as FIGS. 10 and 11.

In the closed state, the grommet 120 and the weather strip 50 are deformed as shown in FIG. 17. Specifically, in the closed state, a lip 37 provided on the first tubular part 132 locally crushes a portion of the first end part 51 along the longitudinal direction, and a lip 37 provided on the second tubular part 133 locally crushes a portion of the second end part 52 along the longitudinal direction. A flange 38 comes into intimate contact with the outer surface of the crushed weather strip 50. In this example, particularly, the flange 38 comes into intimate contact with the outer surface of the weather strip 50 crushed and curved by the lips 37 in the closed state. Since the first tubular part 132 and the second tubular part 133 have the semi-tubular shape, the weather strip 50 directly comes into intimate contact with the door panel 12 on the side opposite to the side on which the weather strip 50 comes into intimate contact with the flange 38.

Advantageous Effects of Second Embodiment

According to the door component including the grommet 120 as described above, it is possible to obtain advantageous effects similar to those of the door component in the first embodiment.

Supplementary Remarks

It has been described above that the grommet 20 is provided with the lips 37. However, this is not an essential configuration. The grommet 20 does not necessarily need to be provided with the lips 37.

It has been described above that the grommet 20 is provided with the flanges 38 and 39. However, this is not an essential configuration. The grommet 20 does not necessarily need to be provided with the flanges 38 and 39.

It has been described above that the weather strip replacement part 34 includes the vehicle body-facing protruding part 35 and the door-facing protruding part 36. However, this is not an essential configuration. For example, instead of the vehicle body-facing protruding part 35 or the door-facing protruding part 36, a protruding part may be formed on the vehicle body 80 or the door panel 12. It has been described above that the grommet 20 is provided with the weather strip replacement part 34. However, this is not an essential configuration. The grommet 20 does not necessarily need to be provided with the weather strip replacement part 34. It has been described above that there is a section where the weather strip 50 is interrupted between the first end part 51 and the second end part 52 of the weather strip 50. However, this is not an essential configuration. A configuration is possible where a section where the weather strip 50 is interrupted between the first end part 51 and the second end part 52 is not provided and the first end part 51 and the second end part 52 of the weather strip 50 are brought into abutment with each other inside the grommet 20, or the like.

It has been described above that the wiring member 60 passes through the grommet 20 so as to overlap the weather strip replacement part 34. However, this is not an essential configuration. For example, the wiring member 60 may pass through the grommet 20 so as to overlap the weather strip 50. That is, the first tubular part 32 or the second tubular part 33 may be formed so as to overlap the wiring housing part 24.

It has been described above that the weather strip 50 is formed continuously from the first end part 51 to the second end part 52 so as to be capable of surrounding the peripheral edge of the door panel 12. However, this is not an essential configuration. The weather strip 50 may be interrupted at some midpoint between the first end part 51 and the second end part 52. That is, the weather strip may include a first weather strip that has the first end part 51 and a second weather strip that has the second end part 52 and is a separate member from the first weather strip.

The configurations described above in relation to the foregoing embodiments and modification examples can be combined as appropriate provided no contradiction arises therebetween.

LIST OF REFERENCE NUMERALS

10 Door
12 Door panel
13 Outer panel
14 Inner panel
15 Inner plate part
16 Side plate part
20, 120 Grommet
21, 121 Outer member
22, 122 Door attachment part
23, 123 Base part
24 Wiring housing part
25 Extension part
26, 126 Hinge part
27 Vehicle body-side part
28 Door-side part
29 Attachment hole
30 Fitting hole
31 Pullout tubular part
32, 132 First tubular part
33, 133 Second tubular part
34, 134 Weather strip replacement part
35 Vehicle body-facing protruding part
36 Door-facing protruding part
37 Lip
38, 39 Flange
40 Protective tubular part
42 Vehicle-body attachment part
44, 144 Inner member
45, 145 First component
46 Second component
45A, 46a Flat plate part
45b, 46c Peripheral wall part
46b Side wall part
47 Protrusion
48 Rib
50 Weather strip
51 First end part
52 Second end part
53 Tubular part
54 Attachment part
60 Wiring member
62 Electrical wire
70 Reinforcement plate
71 Recessed part
72 Attachment hole
80 Vehicle body
C1, C2 Connector

What is claimed is:
1. A door component comprising:
a grommet that is to be attached to a door panel so as to traverse a portion of a peripheral edge; and
a weather strip that is to be attached to the door panel so as to extend along a peripheral edge,
wherein the grommet includes a first tubular part and a second tubular part that are formed so as to be open in mutually different directions,
the weather strip includes a first end part and a second end part along a longitudinal direction, and the first end part of the weather strip is fitted into the first tubular part and the second end part is fitted into the second tubular part, wherein there is a section where the weather strip is interrupted between the first end part and the second end part of the weather strip, wherein the grommet is provided with a weather strip replacement part that water-seals the section in place of the weather strip, wherein the weather strip replacement part includes a door-facing protruding part that protrudes toward the door panel and a vehicle body-facing protruding part that protrudes toward the vehicle body, wherein the door-facing protruding part and the vehicle body-facing protruding part connect the first tubular part and the second tubular part and are both elastically deformable so as to be crushed, wherein the door-facing protruding part is in a constantly crushed state when the grommet is attached to the door panel, and the vehicle body-facing protruding part is elastically deformed so as to be crushed in the closed door state and elastically returns in the open door state.

2. The door component according to claim 1,
wherein the grommet is provided with a lip extending in a circumferential direction on at least a vehicle body-side part of an inner surface of the first tubular part, and
the lip locally crushes a portion of the first end part of the weather strip in a closed door state.

3. The door component according to claim 1,
wherein the grommet is provided with a flange extending from a vehicle body-side part of an opening part of the first tubular part to the outside of the first tubular part, and
the flange comes into intimate contact with an outer surface of the weather strip in the closed door state.

4. The door component according to claim 1, further comprising
a wiring member that is passed through the grommet,
wherein the wiring member passes through the grommet so as to overlap the weather strip replacement part.

5. The door component according to claim 1,
wherein the weather strip is formed continuously from the first end part to the second end part so as to be capable of surrounding the peripheral edge of the door panel.

* * * * *